United States Patent
Magosaki

(10) Patent No.: US 9,015,952 B2
(45) Date of Patent: Apr. 28, 2015

(54) SIX-DIRECTION DIRECTING DEVICE

(75) Inventor: Futoshi Magosaki, Amagasaki (JP)

(73) Assignee: Sumitomo Precision Products Co., Ltd., Hyogo (JP)

( * ) Notice: Subject to any disclaimer, the term of this patent is extended or adjusted under 35 U.S.C. 154(b) by 142 days.

(21) Appl. No.: 13/824,334

(22) PCT Filed: Sep. 26, 2011

(86) PCT No.: PCT/JP2011/071805
§ 371 (c)(1),
(2), (4) Date: May 16, 2013

(87) PCT Pub. No.: WO2012/066852
PCT Pub. Date: May 24, 2012

(65) Prior Publication Data
US 2013/0255090 A1    Oct. 3, 2013

(30) Foreign Application Priority Data
Nov. 19, 2010  (JP) ................................ 2010-259433

(51) Int. Cl.
*G01C 19/38* (2006.01)

(52) U.S. Cl.
CPC ...................... *G01C 19/38* (2013.01)

(58) Field of Classification Search
USPC ............ 33/316, 320, 324, 325, 326, 327
See application file for complete search history.

(56) References Cited

U.S. PATENT DOCUMENTS

| | | | | |
|---|---|---|---|---|
| RE20,983 E | * | 1/1939 | Bates | 33/316 |
| 3,225,452 A | * | 12/1965 | Gates | 33/324 |
| 4,451,990 A | * | 6/1984 | Hojo | 33/327 |
| 6,071,031 A | | 6/2000 | Bailey | |
| 6,594,911 B2 | | 7/2003 | Brunstein et al. | |
| 6,918,186 B2 | | 7/2005 | Ash et al. | |
| 8,099,876 B1 | * | 1/2012 | Truncale et al. | 33/324 |
| 2005/0193578 A1 | * | 9/2005 | Toda | 33/327 |
| 2006/0117879 A1 | | 6/2006 | Ganser | |
| 2009/0119937 A1 | * | 5/2009 | Watson | 33/326 |

(Continued)

FOREIGN PATENT DOCUMENTS

| | | |
|---|---|---|
| JP | 55-5228 | 1/1980 |
| JP | H06-003149 A | 1/1994 |

(Continued)

OTHER PUBLICATIONS

European Search Report dated Jan. 19, 2015, issued in connection with the corresponding European patent application No. 11842112.2, pp. 1-4.

*Primary Examiner* — G. Bradley Bennett
(74) *Attorney, Agent, or Firm* — Rabin & Berdo, P.C.

(57) ABSTRACT

The six direction directing device includes a shaft, a rotation member, a driving source, and a guide member. The shaft extends in an X axis direction. The rotation member is rotatable around an inclined axis inclined at α deg with respect to the shaft. The rotation member has an xyz rectangular coordinate system. The rotation member further includes a spherical surface and an orbit portion formed around an x axis of the spherical surface. The guide member is fixed to an XYZ rectangular coordinate system. The orbit portion has such a shape that the y axis of the rotation member is sequentially directed in + and − directions on the U, V, and W axes that cross one another at intervals of 60 deg around the X axis when the rotation member is rotated in contact with the guide member by the rotation of the shaft.

14 Claims, 18 Drawing Sheets

(56) References Cited

U.S. PATENT DOCUMENTS

| | | |
|---|---|---|
| 2009/0238668 A1 | 9/2009 | Grange et al. |
| 2011/0197460 A1 | 8/2011 | Magosaki |

FOREIGN PATENT DOCUMENTS

| | | |
|---|---|---|
| JP | H06-011350 A | 1/1994 |
| JP | H06-058321 A | 3/1994 |
| JP | H10-509788 A | 9/1998 |
| JP | H11-160072 A | 6/1999 |
| JP | H11-190633 A | 7/1999 |
| JP | 2001-215121 A | 8/2001 |
| JP | 2002-296037 A | 10/2002 |
| JP | 2008-215956 A | 9/2008 |
| JP | 2010-505087 A | 2/2010 |
| WO | 2010/047078 A1 | 4/2010 |

* cited by examiner

SIX-DIRECTION DIRECTING DEVICE

TECHNICAL FIELD

The present invention relates to six-direction directing devices, and more specifically to a six-direction directing device that can be used as a north finder used to detect true north using a single-axis gyro.

BACKGROUND ART

Since magnetic north is slightly shifted from true north, true north cannot be measured using a magnetic compass. However, administrative maps are produced based on true north, and the Construction Standards Act is also based on true north. Therefore, in the field of civil engineering and construction, true north must be determined correctly. In underground tunnel construction, in particular, the magnetic compass does not function correctly because of the effect of a mineral vein.

There is a known conventional gyro compass that detects the earth's rotational angular velocity to determine true north. As disclosed by JP-A 2002-296037, U.S. Pat. Nos. 6,594,911 and 6,918,186, gyro compasses are generally a tri-axial orthogonal type device. These gyro compasses are large in size and costly to manufacture.

In order to reduce the size and cost, single axis or two-axis gyro compasses are suggested by JP-A 6-3149, JP-A 6-11350, JP-A 11-160072, JP-A 11-190633, and JP-A 2001-215121. Most of such gyro compasses have a gyro sensor and an acceleration sensor rotated on a rotation base. In these gyro compasses, however, a large space must be secured for its large rotation angle. This limits how compact the device can be. Most of single-axis gyro compasses need a horizontal plane, which makes it difficult to handle them. Single-axis gyro compasses that do not need a horizontal plane have been suggested, but their direction measuring accuracy is inferior to those of three-axis compasses.

Therefore, the applicant has suggested a single-axis type azimuth measuring device that does not need a horizontal plane in the disclosure of JP-A 2008-215956. The azimuth measuring device disclosed by the document takes into account a UVW rectangular coordinate system in addition to the XYZ rectangular coordinate system. Six directions, +U, −U, +V, −V, +W, and −W directions are provided apart at intervals of 60 deg when they are reflected orthogonally on a YZ plane. Elevation angles α formed between the U, V, and W axes and the YZ plane are each preferably from 30 to 40 deg, more preferably 35.26 deg. The reason for the arrangement is described in JP-A 2008-215956 or International Publication WO2010/047078 that will be described.

The azimuth measuring device includes a rotational angular velocity sensor that detects rotational angular velocities $\omega_U$, $\omega_V$, and $\omega_W$ around the respective axes in the UVW rectangular coordinate system, a gravitational acceleration sensor that detects gravitational accelerations $g_U$, $g_V$, and $g_W$ in the respective axial directions, a first stepping motor that rotates the rotational angular velocity sensor and the gravitational acceleration sensor by 60×n° (n: a natural number) around the X axis for positioning, and a second stepping motor that swings the rotational angular velocity sensor and the gravitational acceleration sensor by ±35.26 deg around an axis orthogonal to the X axis for positioning. The azimuth measuring device measures the rotational angular velocities $\omega_U$, $\omega_V$, and $\omega_W$ and the gravitational accelerations $g_U$, $g_V$ and $g_W$ around the respective axes and subject the obtained rotational angular velocities $\omega_U$, $\omega_V$, and $\omega_W$ and the gravitational accelerations $g_U$, $g_V$, and $g_W$ to coordinate transformation to produce rotational angular velocities $\omega_X$, $\omega_Y$, and $\omega_Z$ and gravitational accelerations $g_X$, $g_Y$, and $g_Z$ in the XYZ rectangular coordinate system. Then, an azimuth angle ψ is calculated based on the obtained rotational angular velocities $\omega_X$, $\omega_Y$, and $\omega_Z$ and gravitational accelerations $g_X$, $g_Y$, and $g_Z$. Using the azimuth measuring device, the rotational angular velocity sensor and the gravitational acceleration sensor are swung only by ±35.26 deg, so that the rotation angle is small and a necessary space is not larger than the space required by the conventional azimuth measuring device. Therefore, the size can be reduced as compared to the conventional single-axis azimuth measuring device.

Furthermore, the applicant has proposed a six-direction directing device that can be directed in the above-described six directions, +U, −U, +V, −V, +W, and −W only with a single driving source in the disclosure of International Publication WO2010/047078. The disclosed six-direction directing device includes an inclined crank mechanism including a rotation member, a guide pin attached to the rotation member, and a guide that surrounds the rotation member. The guide has a case shaped and a track slit. The guide pin is inserted in the track slit and contacts with the track slit. When the inclined crank mechanism is rotated by the driving source, the guide pin rotates around along the track slit, so that the rotation member rotates. At the time, the rotational angular velocity sensor and the gravitational acceleration sensor are sequentially directed in the six directions, +U, −U, +V, −V, +W, and −W directions.

DISCLOSURE OF THE INVENTION

As described above, the six-direction directing device disclosed by International Publication WO2010/047078 can be directed in the six directions only with the single driving force. However, it is difficult to process the track slit at the guide. Therefore, it is preferable that the six directions can be directed with the one driving force using a different mechanism.

It is an object of the present invention to provide a six-direction directing device that can be directed in six directions with one driving source.

A six-direction directing device according to an embodiment of the present invention is provided in an XYZ rectangular coordinate system. The six-direction directing device includes a shaft, a rotation member, a driving source, and a guide member. The shaft extends in an X axis direction. The rotation member is rotatable around an axis inclined at α deg with respect to the shaft and coupled to said shaft. The rotation member has an xyz rectangular coordinate system. The rotation member further includes a spherical surface and an orbit portion formed around an x axis of said spherical surface. The driving source rotates the shaft around the X axis. The guide member is fixed to the XYZ rectangular coordinate system and in contact with said orbit portion. The orbit portion has such a shape that a y axis of the rotation member is directed sequentially in + and − directions on U, V, and W axes that cross one another at intervals of 60 deg around the X axis when the rotation member rotates in contact with the guide member by rotation of said shaft.

The six-direction directing device according to the embodiment can be directed in six directions, +U, −U, +V, −V, +W, and −W directions.

BEST MODE FOR CARRYING OUT THE INVENTION

Figure 1:
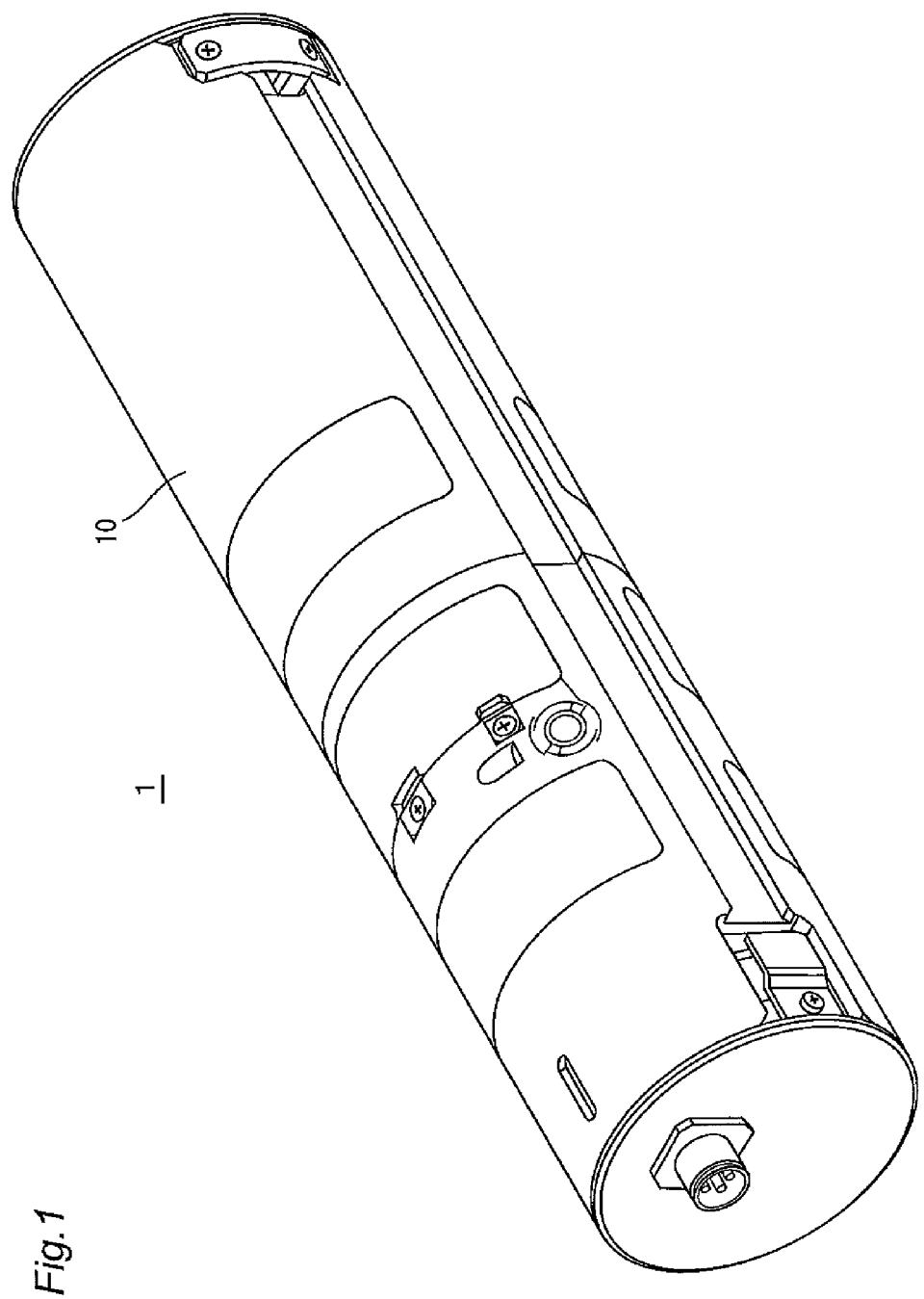
FIG. 1 is an overview of a six-direction directing device according to an embodiment of the present invention.

Now, an embodiment of the present invention will be described in detail in conjunction with the accompanying drawings, in which the same or corresponding portions are designated by the same reference characters and their description will not be repeated.

Structure of Six-Direction Directing Device

FIG. 1 is an overview of a six-direction directing device 1 according to an embodiment of the present invention. The six-direction directing device includes a tubular case 10.

Figure 2:
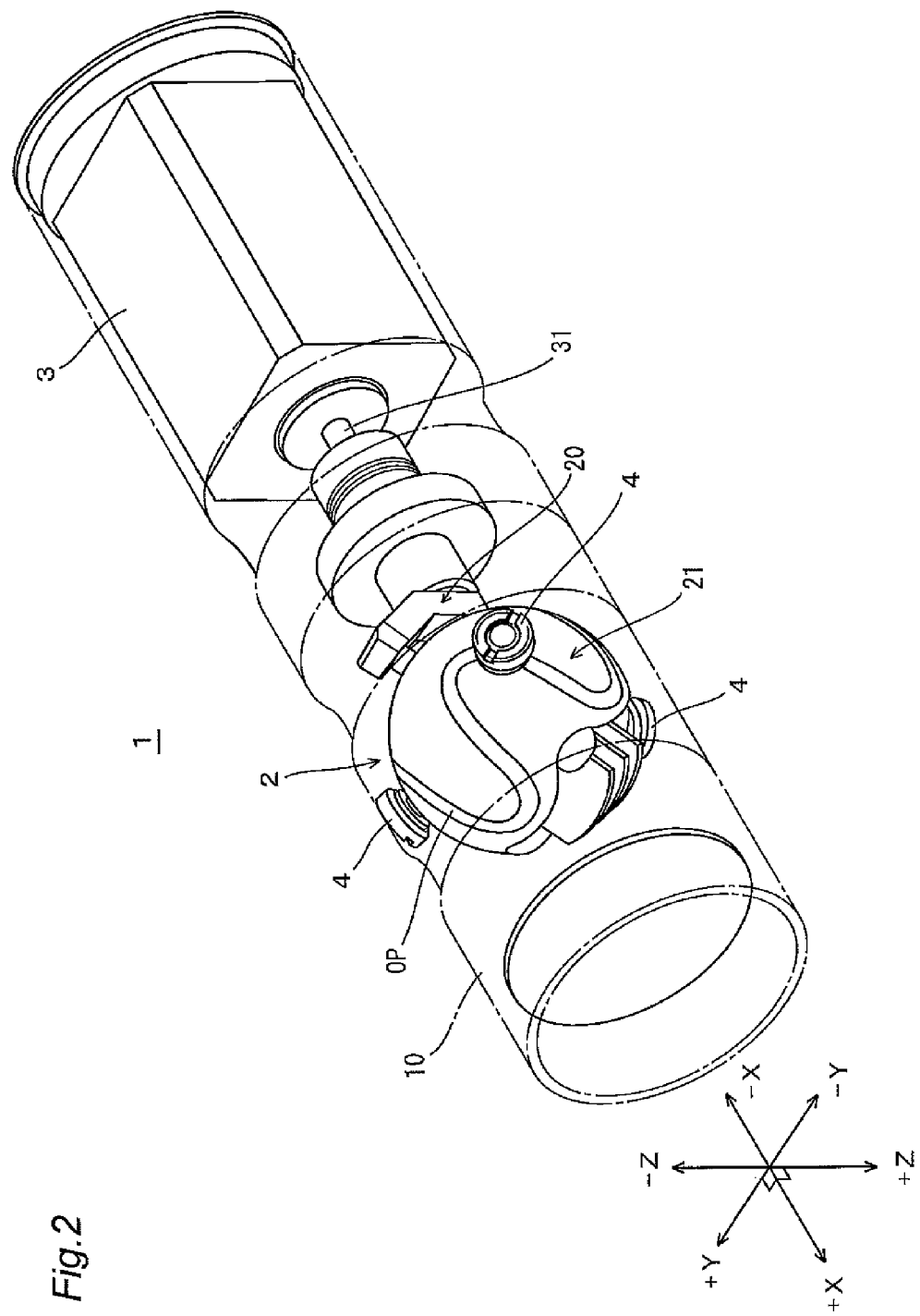
FIG. 2 is a perspective view showing a structure inside the six-direction directing device in FIG. 1.

FIG. 2 is a perspective view showing an inside structure of the case 10 in FIG. 1. In FIG. 2, a part of the case 10 is shown by a dashed line. Referring to FIG. 2, the six-direction directing device 1 further includes a driving source 3, an inclined crank mechanism 2, and a plurality of guide members 4. The driving source 3 and the plurality of guide members 4 are fixed to the case 10.

The driving source 3 is stored in a rear part of the case 10. The driving source 3 has a driving shaft 31 and rotates the driving shaft 31 around a central axis of the driving shaft 31. The driving source 3 is for example a motor. The motor can be any kind of motor. The motor may be for example a stepping motor or an ultrasonic motor.

As shown in FIG. 2, the six-direction directing device 1 is provided in an XYZ rectangular coordinate system. More specifically, the case 10 is fixed to the XYZ rectangular coordinate system. The XYZ rectangular coordinate system is a rectangular coordinate system in which the X, Y, and Z axes form 90 deg among one another. The case 10 allocates the X axis on the driving shaft 31 of the driving source 3. In this example, the +X direction is defined as the front side of the case 10 and the −X direction as the rear side of the case 10. In this example, the Z axis is allocated to the vertical direction. The Y axis is allocated to the horizontal direction. In this example, the +Z direction is defined as a lower side of the case 10 and the −Z direction as an upper side of the case 10. The +Y direction is defined as the left side as viewed from the front of the case 10 and the −Y direction as the right side as viewed from the front of the case 10. The driving source 3 and the guide member 4 are fixed to the case 10. Therefore, the driving source 3 and the guide member 4 are fixed to the XYZ rectangular coordinate system.

The inclined crank mechanism 2 is stored in a central part of the case 10. The inclined crank mechanism 2 is provided in front of the driving source 3.

Structure of Inclined Crank Mechanism 2

Figure 3:
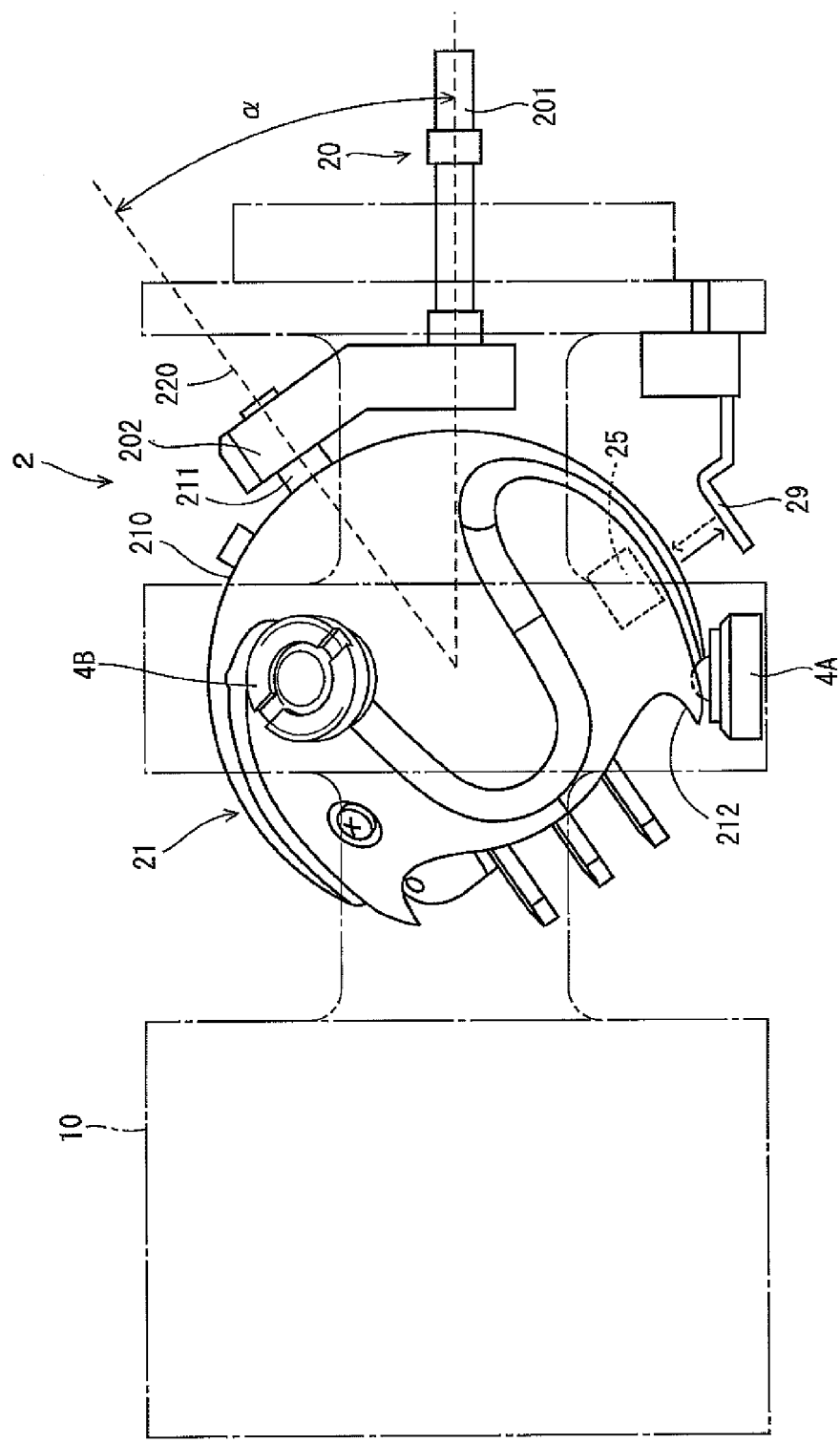
FIG. 3 is a side view of an inclined crank mechanism and its vicinity in the six-direction directing device in FIG. 2.

FIG. 3 is a side view of the inclined crank mechanism 2 and its vicinity in the six-direction directing device 1 in FIG. 2. In FIG. 3, a part of the case 10 is indicated by a dashed line. Referring to FIG. 3, the inclined crank mechanism 2 includes a shaft 20 and a rotation member 21.

The shaft 20 rotates by the driving source 3. The rotation member 21 is coupled to the shaft 20 so that the member can rotate around an inclined axis 220 inclined with respect to the shaft 20. When the shaft 20 rotates, the rotation member 21 swings up and down with respect to the X axis and rotates around the inclined axis 220. The inclined axis 220 crosses the X axis at an inclination angle α deg.

The shaft 20 includes a rod-shaped main body 201 and an arm member 202. The main body 201 is provided on the X axis. The main body 201 has its rear end coupled to the driving shaft 31. Therefore, the main body 201 is driven by the driving source 3 to rotate around a central axis of the main body 201. The arm member 202 is provided at a tip end of the main body 201.

The arm member 202 extends in a direction crossing the X axis. In this example, the arm member 202 extends substantially orthogonally to the X axis and has its upper end curved toward the front of the six-direction directing device 1. The arm member 202 has its rear end attached to the main body 201. The arm member 202 has its upper end coupled to the rotation member 21.

Structure of Rotation Member 21

The rotation member 21 is provided in front of the shaft 20 and coupled with the shaft 20 through the arm member 202. The rotation member 21 includes a main body 210 and an inclined shaft 211. The main body 210 has a spherical shape and a storage chamber 212 having an opening at the front part. The inclined shaft 211 is provided upright on a surface of the rotation member 21. The inclined shaft 211 is further provided on the inclined axis 220. An upper end of the inclined shaft 211 is provided rotatably in the boss of the arm member 202. In this way, the rotation member 21 is attached rotatably around the axis 220 that is is inclined at α deg with respect to the main body 201 of the shaft 20.

Figure 4:
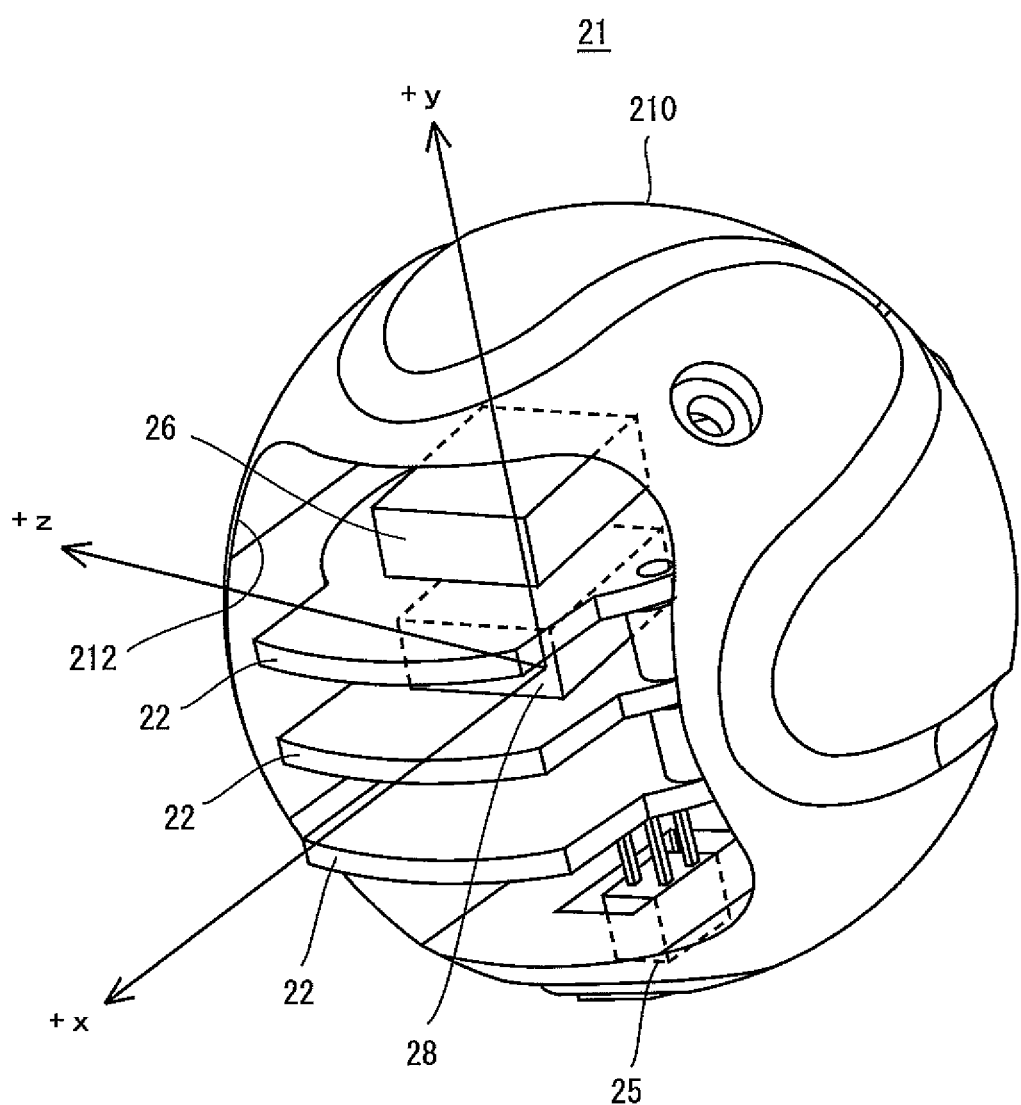
FIG. 4 is a perspective view of a rotation member in FIG. 3.

FIG. 4 is a perspective view of the rotation member 21. Referring to FIG. 4, the rotation member 21 further includes a plurality of substrates 22, a rotational angular velocity sensor 26, a gravitational acceleration sensor 28, and a position sensor 25. The plurality of substrates 22 are stored in the storage chamber 212. The plurality of substrates 22 are provided with gaps among them in the up-down direction in FIG. 4. The rotation angular velocity sensor 26 is attached on the uppermost substrate 22. The gravitational acceleration sensor 28 is attached on the substrate 22 in the middle. The rotational angular velocity sensor 26 and the gravitational acceleration sensor 28 may be provided in any locations on any of the substrates 22.

The position sensor 25 is provided on the lowermost substrate 22. The position sensor 25 includes an optical transmitter and an optical receiver. Referring to FIG. 3, a reflector 29 is provided under the case 10. When the six-direction directing device 1 is viewed from the front, the reflector 29 overlaps the Z axis. The optical receiver in the position sensor 25 outputs light to the outside of the rotation member 21. When the rotation member 21 is moved (rotated) to a prescribed position by the driving source 3, light emitted from the optical transmitter is reflected by the reflector 29. When the optical receiver in the position sensor 25 receives the reflected light, the position sensor 25 outputs a detection signal to an information processor 30 that will be described. By the above-described operation, the six-direction directing device 1 can determine a rotation start position for the rotation member 21 using the position sensor 25.

Referring back to FIG. 4, the rotation member 21 further has an xyz rectangular coordinate system. The xyz rectangular coordinate system is fixed to the rotation member 21 unlike the XYZ rectangular coordinate system. As shown in FIG. 4, in this example, the +x direction is directed to the front of the rotation member 21. The +y direction matches the directing direction of the rotation angular velocity sensor 26 and the gravitational acceleration sensor 28.

The rotation angular velocity sensor 26 detects a rotation angular velocity component around the directing direction (i.e., the y axis direction). The gravitational acceleration sensor 28 detects a gravitational acceleration component around the directing direction (i.e., the y axis direction).

As described above, the xyz rectangular coordinate system is fixed to the rotation member 21. On the other hand, the XYZ rectangular coordinate system is fixed to the case 10. Therefore, when the rotation member 21 is moved (rotated) with respect to the XYZ rectangular coordinate system, the xyz rectangular coordinate system is moved (rotated) with respect to the XYZ rectangular coordinate system.

Figure 5:
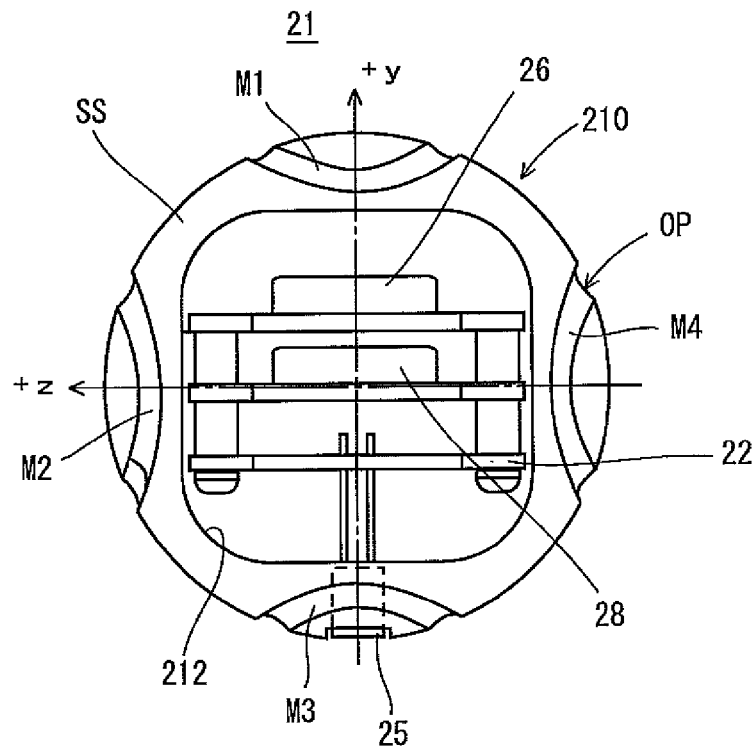
FIG. 5 is a front view of the rotation member in FIG. 3.
Figure 6:
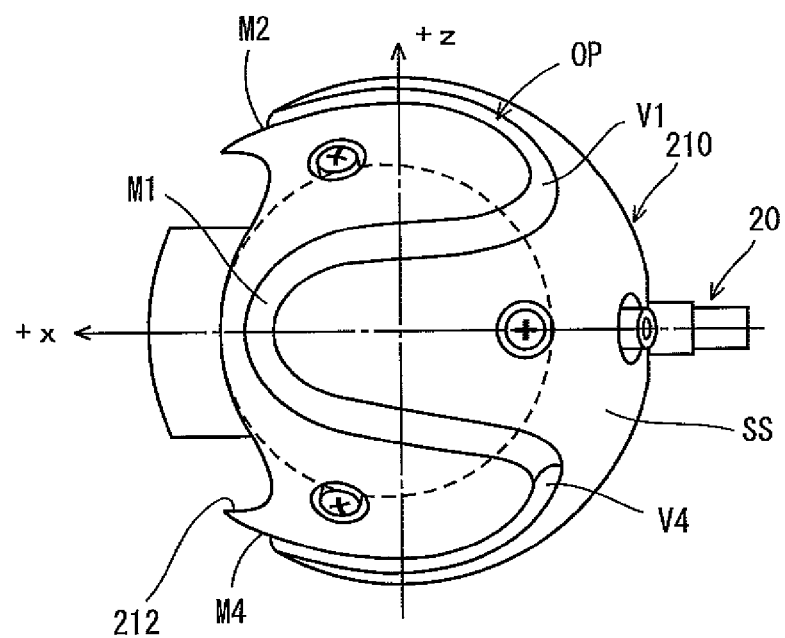
FIG. 6 is a plan view of the rotation member in FIG. 3.
Figure 7:
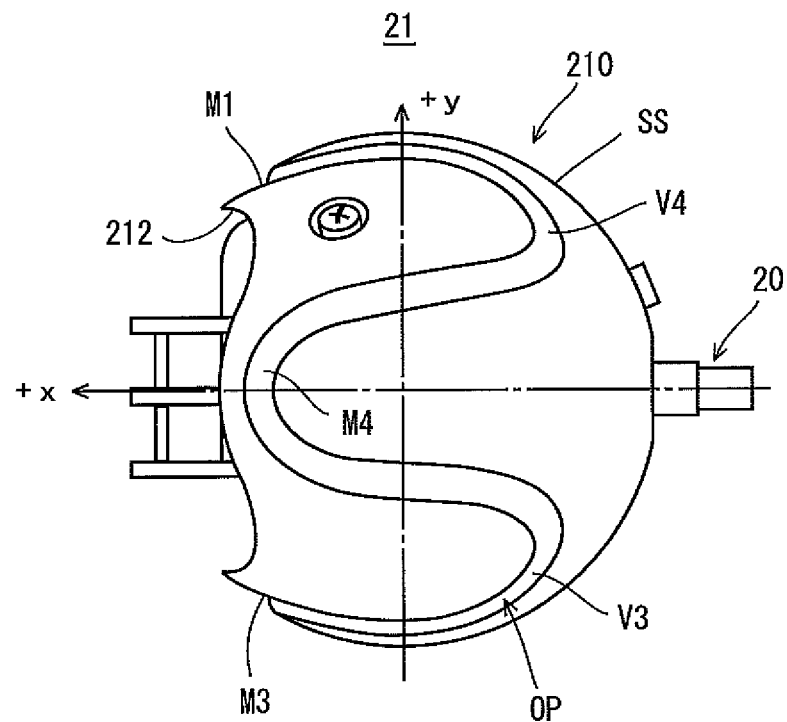
FIG. 7 is a side view of the rotation member in FIG. 3.
Figure 8:
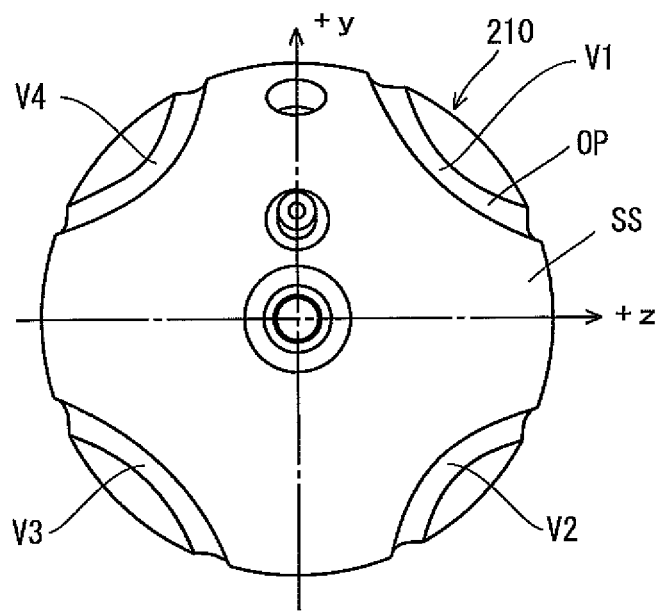
FIG. 8 is a rear view of the rotation member in FIG. 3.

FIG. 5 is a front view of the rotation member 21. FIG. 6 is a plan view of the rotation member 21. FIG. 7 is a side view of the rotation member 21. FIG. 8 is a rear view of the rotation member 21. Referring to FIGS. 5 to 8, the main body 210 has a spherical surface SS. The spherical surface SS has an orbit portion OP. In this example, the orbit portion OP is a groove formed at the spherical surface SS. The orbit portion OP is formed around the x axis and has a plurality of mountain-like portions M1 to M4 having a ridge in the +x direction and a plurality of valley-like portions V1 to V4 having a ridge in the −x direction. In short, the orbit portion OP is a zigzag shaped groove extending around the x axis. Referring to FIGS. 4 to 7, the opening of the storage chamber 212 is rectangular and its corners correspond to the positions of the four valley-like portions V1 to V4. In this way, the storage chamber 212 may be formed to have a large capacity without overlapping the orbit portion OP.

Figure 9:
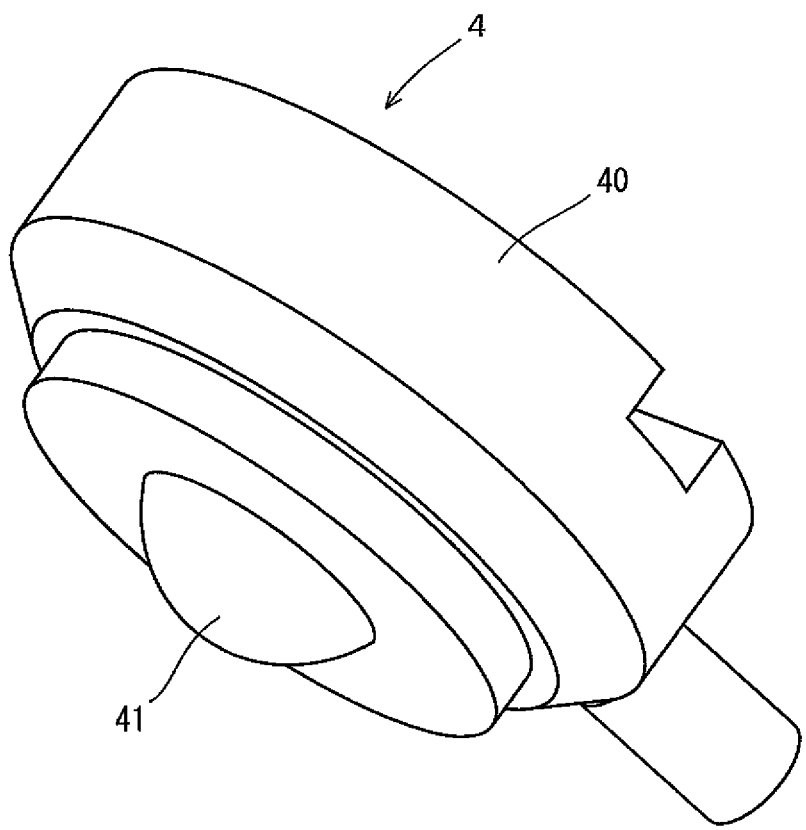
FIG. 9 is a perspective view of a guide member in FIG. 2.

Referring to FIGS. 2 and 3, a plurality of guide members 4 (4A to 4C) are fixed to the case 10. The guide members are each provided on the same YZ plane. FIG. 9 is a perspective view of the guide member 4. Referring to FIG. 9, the guide member 4 includes a base 40 and a ball 41. The ball 41 is attached to a lower end of the base 40 in a rotatable manner.

Figure 10:
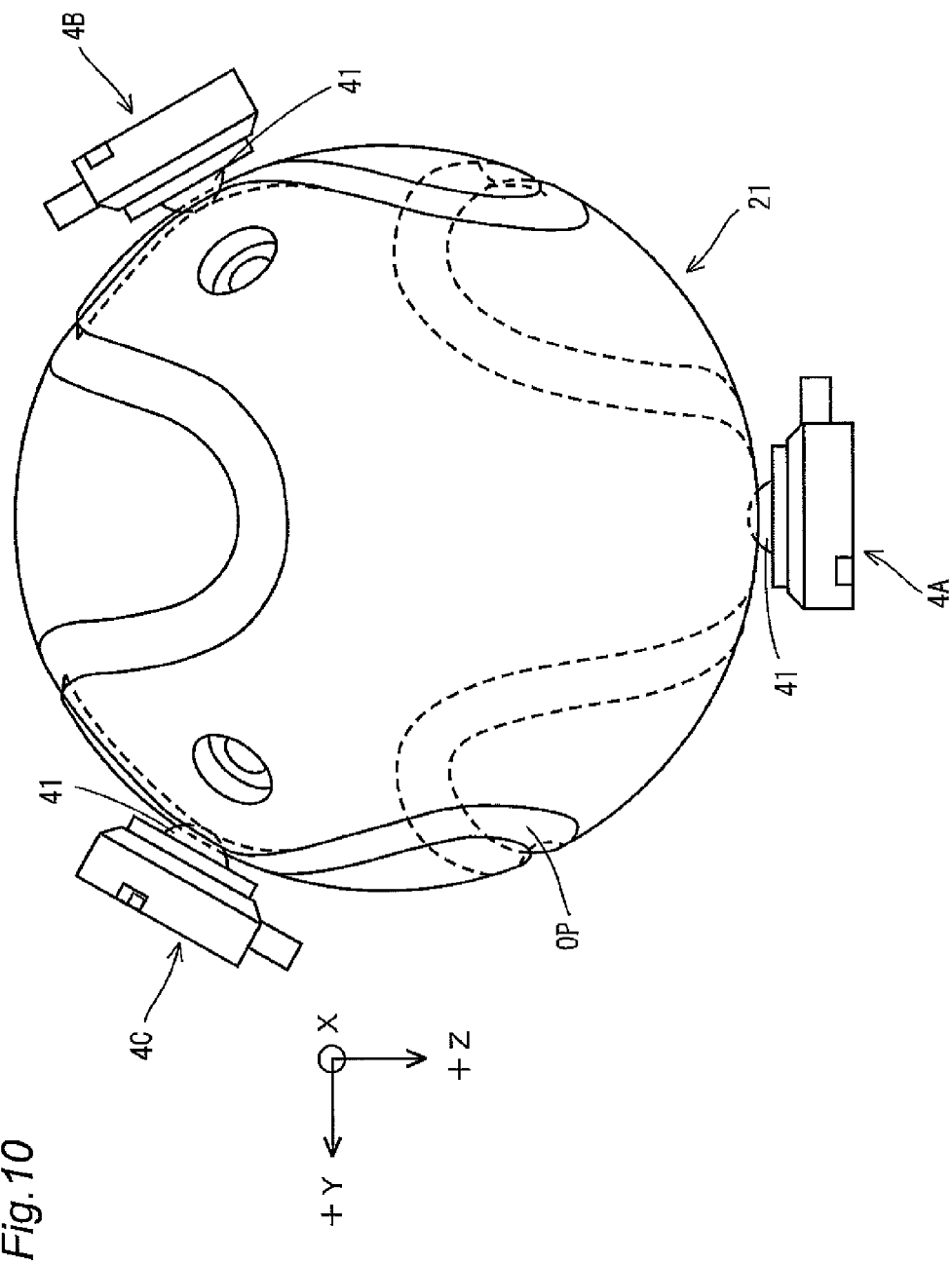
FIG. 10 is a view showing a positional relation between the rotation member and each guide member in an XYZ rectangular coordinate system.

FIG. 10 is a view showing a positional relation between the rotation member 21 and the guide members 4 in the XYZ rectangular coordinate system. Referring to FIG. 10, the three guide members 4A to 4C are fixed to the XYZ rectangular coordinate system. The guide members 4A to 4C are provided at equal intervals around the X axis. Stated differently, the guide members 4A to 4C are provided at intervals of 120 deg around the X axis. In this example, the guide member 4A is provided on the Z axis (on the side of +Z direction). The guide member 4B is provided in a position 120 deg rotated anticlockwise from the guide member 4A around the X axis and the guide member 4C is provided in a position 240 deg rotated anticlockwise when the six-direction directing device 1 is viewed from the front.

The balls 41 of the guide members 4A to 40 are inserted in the groove-shaped orbit portion OP and contact the orbit portion OP. The rotation member 21 is supported rotatably at the case 10 by the guide members 4A to 4C. When the rotation member 21 rotates, the ball 41 moves on the orbit portion OP. Therefore, how the rotation member 21 rotates depends on the shape of the orbit portion OP.

Relation Between UVW Coordinate System and XYZ Rectangular Coordinate System

Figure 11:
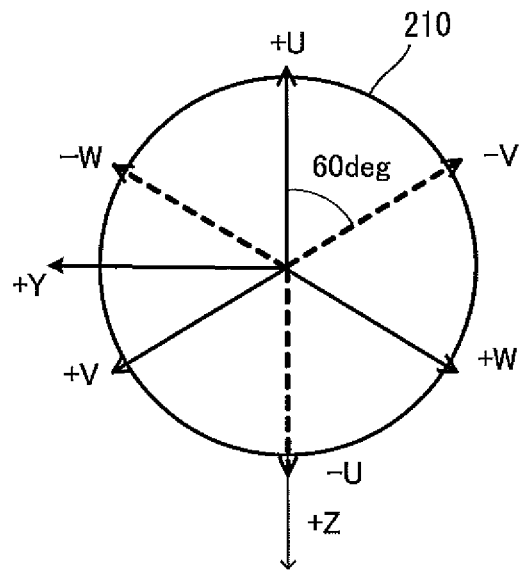
FIG. 11 is a view showing a relation between an XYZ rectangular coordinate system and a UVW coordinate system.
Figure 12:
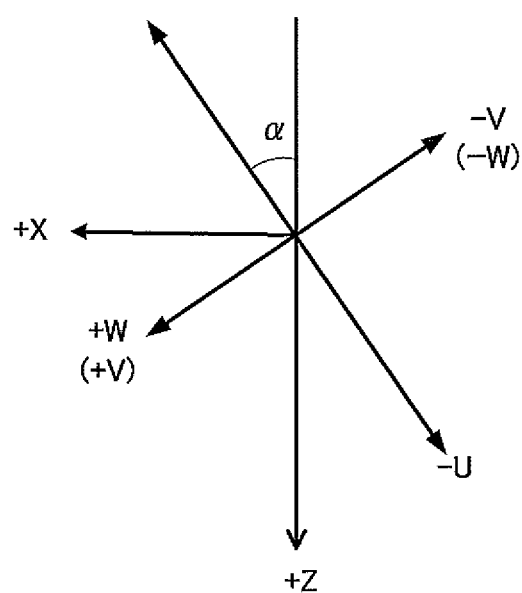
FIG. 12 is another view showing the relation between the XYZ rectangular coordinate system and the UVW coordinate system.

As described above, the six-direction directing device 1 is provided in the XYZ rectangular coordinate system. The embodiment also takes into account a UVW coordinate system. A relation between the XYZ rectangular coordinate system and the UVW coordinate system is shown in FIGS. 11 and 12. FIG. 11 is a view of a YZ plane viewed in the −X direction from the +X direction, and FIG. 12 is a view of a ZX plane viewed in the +Y direction from the −Y direction (the right side view of FIG. 11). An elevation angle formed between U, V, or W axis and the YZ plane is defined as α deg. More specifically, the inclination angle α of the inclined axis 220 with respect to the shaft 20 matches the elevation angle. Crossing angles of the U, V, and W axes are defined as β.

The six axes, +U, −U, +V, −V, +W, and −W are always provided at intervals of 60 deg on the YZ plane. More specifically, referring to FIG. 11, the +U axis matches the −Z axis when it is reflected orthogonally on the YZ plane. The −U axis matches the +Z axis when it is reflected orthogonally on the YZ plane. The −W axis forms an angle of 60 deg with respect to the −Z axis when it is reflected orthogonally on the YZ plane. The +W axis forms an angle of 60 deg with respect to the +Z axis when it is reflected orthogonally on the YZ plane. The +V axis forms an angle of 60 deg with respect to the +Z axis when it is reflected orthogonally on the YZ plane. The −V axis forms an angle of 60 deg with respect to the −Z axis when it is reflected orthogonally on the YZ plane. Among the +U, −U, +V, −V, +W, and −W axes in FIG. 11, the axes depicted by the dotted lines extend backward beyond the surface of the sheet of FIG. 11, and the axes depicted by the solid lines extend forward in front of the surface of the sheet of FIG. 11. The elevation angle α is preferably from 30 to 40 deg, most preferably $\alpha = \tan^{-1}(1/\sqrt{2}) = 35.26$ deg. The crossing angle β is most preferably 90 deg. Now, an example where α=35.26 deg and β=90 deg will be described.

In the following description, in the xyz rectangular coordinate system, the x axis on the +x side will be referred to as the "+x axis" and the x axis on the −x axis side will be referred to as the "−x axis." The same definition as that of the above x axis applies to the other axes. The same definition as the above x axis applies to the other coordinate systems (in the XYZ rectangular coordinate system and the UVW coordinate system).

The origins of the XYZ rectangular coordinate system, the xyz rectangular coordinate system, and the UVW rectangular coordinate system are all at the central point of the main body 210 of the rotation member 21.

Operation of Six-Direction Directing Device 1

The six-direction directing device 1 measures rotational angular velocities $\omega_U$, $\omega_V$ and $\omega_W$ around each of the axes of the UVW rectangular coordinate system and gravitational accelerations $g_U$, $g_V$, and $g_W$ in each axis direction. The six-direction directing device 1 then coordinate-transforms the obtained rotational angular velocities $\omega_U$, $\omega_V$ and $\omega_W$ and gravitational accelerations $g_U$, $g_V$, and $g_W$ into rotational angular velocities $\omega_X$, $\omega_Y$ and $\omega_Z$ and gravitational accelerations $g_X$, $g_Y$, and $g_Z$ in the XYZ rectangular coordinate system. The six-direction directing device 1 then produces an azimuth angle $\psi$ based on the rotational angular velocities $\omega_X$, $\omega_Y$, $\omega_Z$ and the gravitational accelerations $g_X$, $g_Y$, and $g_Z$. In the six-direction directing device 1, the rotational angular velocity sensor 26 and the gravitational acceleration sensor 28 are swung only by ±α deg. Therefore, the rotation angle is small, so that a large space required by a conventional direction measuring device is not necessary.

When the rotational angular velocities $\omega_U$, $\omega_V$, and $\omega_W$ and gravitational accelerations $g_U$, $g_V$, and $g_W$ in the UVW rectangular coordinate system are measured, it is necessary to cause the directing direction of the rotational angular velocity sensor 26 and the gravitational acceleration sensor 28 (the +y direction in this example) to be the + and − direction on each of the U, V, and W axes by the rotation of the rotation member 21.

The orbit portion OP has such a shape that the +y axis of the rotation member 21 is directed sequentially in the + and − directions on the U, V, and W axes when the rotation member 21 rotates by the rotation of the shaft 20 while being in contact with the plurality of guide members 4A to 4C. Now, the shape of the orbit portion OP will be described.

Orbit of +y Axis during Rotation of Rotation Member 21

In order to described about the shape of the orbit portion OP, the locus of the +y axis during rotation of the rotation member 21 will be described first.

Figure 13:
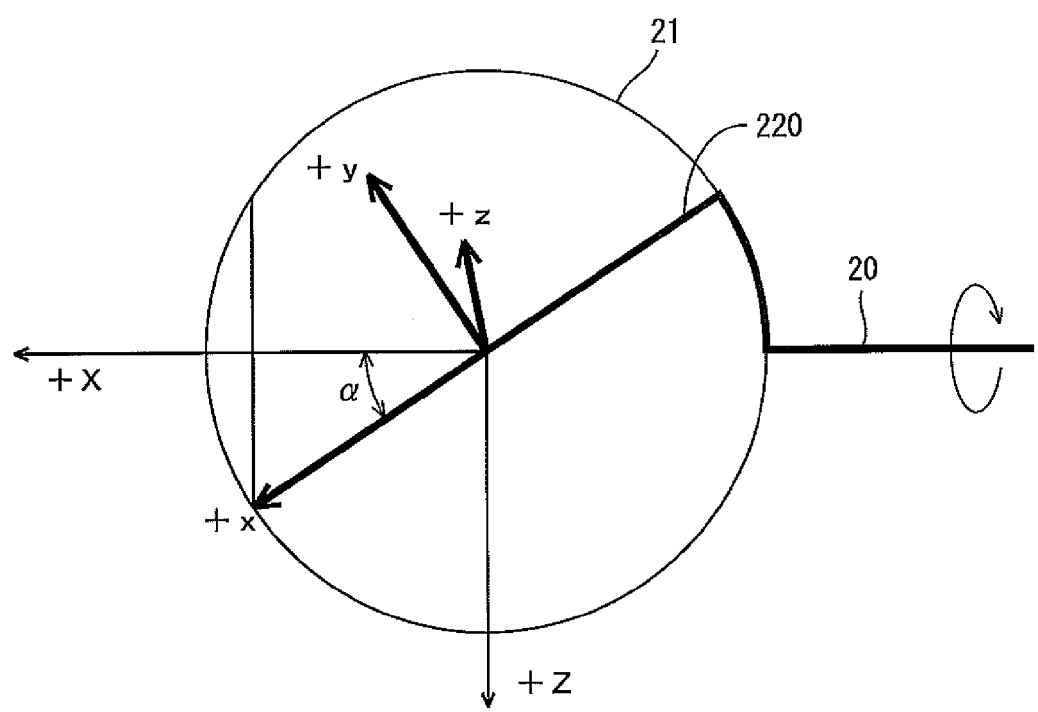
FIG. 13 is a schematic view showing a relation between the XYZ rectangular coordinate system and an xyz rectangular coordinate system when viewed in the +Y direction.

To start with, a relation between the XYZ rectangular coordinate system fixed to the case 10 and the xyz rectangular coordinate system fixed to the rotation member 21 will be described. FIG. 13 is a schematic view showing a relation between the XYZ rectangular coordinate system and the xyz rectangular coordinate system when viewed in the +Y direction. Referring to FIG. 13, the x axis matches the inclined axis 220. Therefore, the angle formed by the x axis and the X axis is α deg. The y axis is provided on an XZ plane when the rotation member 21 is provided in the position shown in FIG. 13. Referring to FIGS. 12 and 13, the +y axis matches the +U axis when the rotation member 21 is provided in the position shown in FIG. 13. In the following description, the position shown in FIG. 13 is defined as a rotation start position. Note that the position sensor 25 outputs a detection signal to the information processor 30 (FIG. 22) when the rotation member 21 moves to the position shown in FIG. 13.

Figure 14:
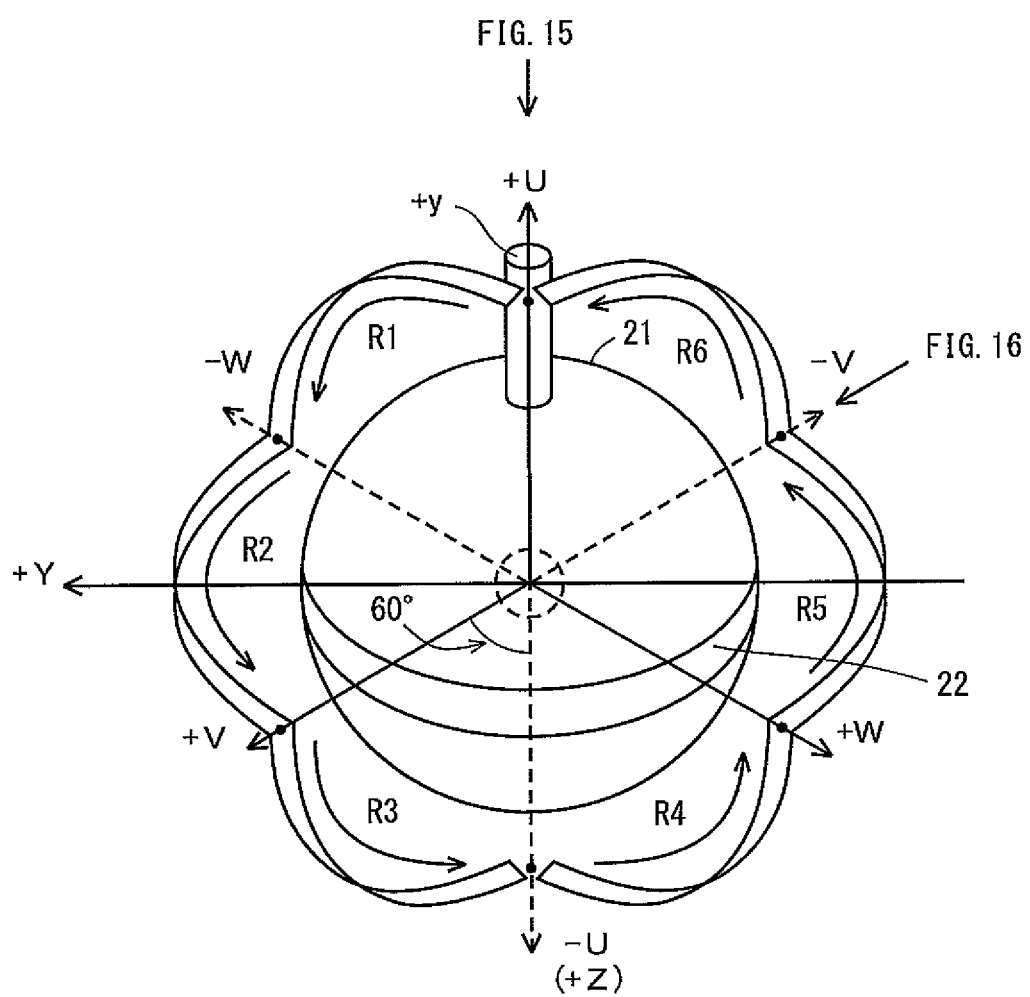
FIG. 14 is a front view of the rotation member when the rotation member is provided in a rotation start position.
Figure 15:
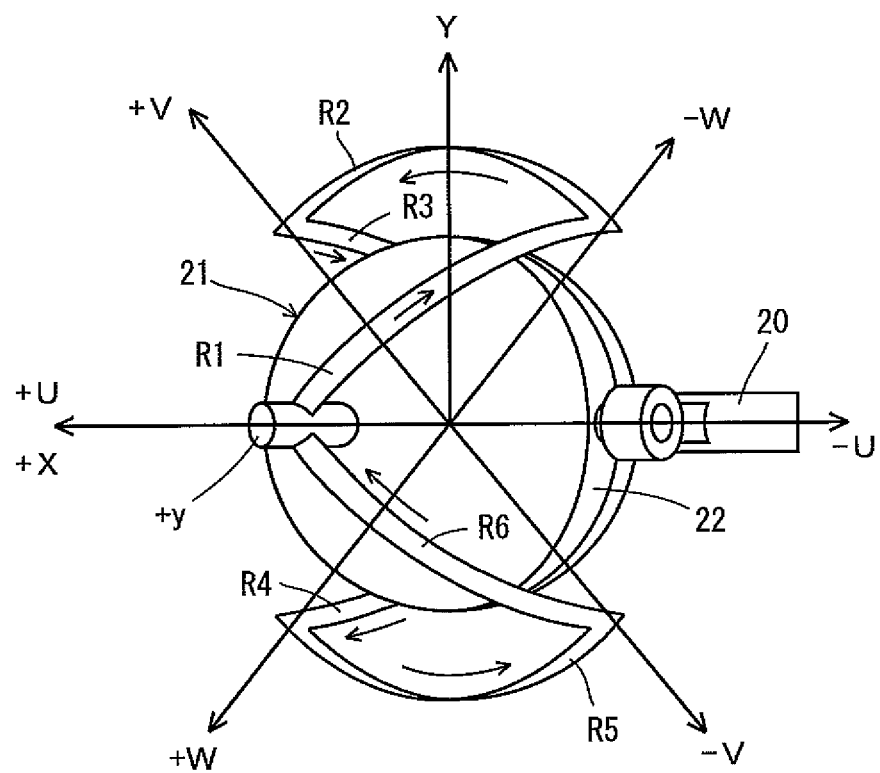
FIG. 15 is a view of the rotation member in the rotation start position when viewed in the +Z direction from the −Z direction.
Figure 16:
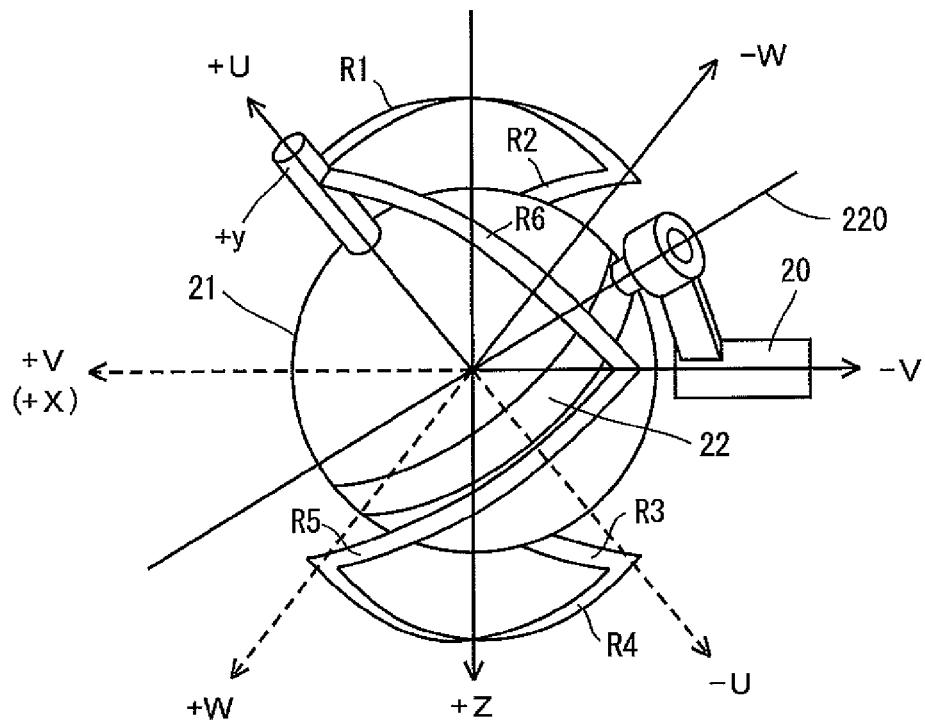
FIG. 16 is a view of the rotation member in FIG. 14 as viewed in a direction rotated clockwise from the position in FIG. 15 by 60 deg around the X axis

FIG. 14 is a front view of the rotation member 21 when the rotation member 21 is provided in the rotation start position, in other words, a view as seen in the −X direction from the +X direction. FIG. 15 is a view of the rotation member 21 in the rotation start position as viewed in the +Z direction from the −Z direction. FIG. 16 is a view of the rotation member in FIG. 14 as seen in a direction rotated by 60 deg clockwise around the X axis from the position in FIG. 15.

In FIGS. 14 to 16, the +y axis has a rod shape. Referring to FIGS. 14 to 16, the +y axis matches the +U axis in the rotation start position as described above.

As described above, when the rotational angular velocities $\omega_U$, $\omega_V$, and $\omega_W$ and gravitational accelerations $g_U$, $g_V$, and $g_W$ in the UVW rectangular coordinate system are measured, the six-direction directing device 1 must cause the +y axis as the directing direction of the rotational angular velocity sensor 26 and the gravitational acceleration sensor 28 to be the + and − directions on each of the U, V, and W axes by the rotation of the rotation member 21.

As a method of causing the +y axis to be sequentially directed in the + and − directions on each of the U, V, and W axes, the six-direction directing device 1 causes the +y axis to be directed in these directions sequentially in the order of the +U, −W, +V, −U, +W, and −V axes (and then to the +U axis) in FIGS. 14 to 16. At the time, the +y axis moves in the order of the loci R1, R2, R3, R4, R5, and R6 (and then to the locus R1).

Then, the shape of each of the loci R1 to R6 when the +y axis moves on the above described loci (from the loci R1 to R6) is obtained.

The relation between the XYZ rectangular coordinates and the UVW coordinates is as shown in FIGS. 11 and 12. In addition, the relation between the XYZ rectangular coordinates and the xyz rectangular coordinates in the rotation start position is as shown in FIG. 13. Here, unit vectors of the x, y, and z axes in the xyz coordinate system are i, j, and k vectors. In the xyz coordinate system, the i, j, and k vectors are defined by the following Expression (1):

$$i = \begin{bmatrix} 1 \\ 0 \\ 0 \end{bmatrix}, j = \begin{bmatrix} 0 \\ 1 \\ 0 \end{bmatrix}, k = \begin{bmatrix} 0 \\ 0 \\ 1 \end{bmatrix} \quad (1)$$

The i, j, and k vectors are further defined by the following Expression (2) in the XYZ coordinate system.

$$i = \begin{bmatrix} i_X \\ i_Y \\ i_Z \end{bmatrix}, j = \begin{bmatrix} j_X \\ j_Y \\ j_Z \end{bmatrix}, k = \begin{bmatrix} k_X \\ k_Y \\ k_Z \end{bmatrix} \quad (2)$$

In the expression, $i_X$ is the vector component of the i vector on the X axis, $i_Y$ is its vector component on the Y axis, and $i_Z$ is its vector component on the Z axis. Similarly, $j_X$ is the vector component of the j vector on the X axis, $j_Y$ is its vector component on the Y axis, and $j_Z$ is its vector component on the Z axis. Similarly, $k_X$ is the vector component of the k vector on the X axis, $k_Y$ is its vector component on the Y axis, and $k_Z$ is its vector component on the Z axis.

A coordinate transformation matrix from the xyz coordinate system to the XYZ coordinate system is given by the following Expression (3):

$$\begin{bmatrix} X \\ Y \\ Z \end{bmatrix} = \begin{bmatrix} i_X & j_X & k_X \\ i_Y & j_Y & k_Y \\ i_Z & j_Z & k_Z \end{bmatrix} \begin{bmatrix} x \\ y \\ z \end{bmatrix} \quad (3)$$

Conversely, a coordinate transformation matrix from the XYZ coordinate system to the xyz coordinate system is given by the following Expression (4):

$$\begin{bmatrix} x \\ y \\ z \end{bmatrix} = \begin{bmatrix} i_X & i_Y & i_Z \\ j_X & j_Y & j_Z \\ k_X & k_Y & k_Z \end{bmatrix} \begin{bmatrix} X \\ Y \\ Z \end{bmatrix} \quad (4)$$

The coordinate transformation matrix according to Expression (4) is the inverse matrix (transposed matrix) of the coordinate transformation matrix according to Expression (3). To start with, in view of the above, the locus of an i vector in the XYZ rectangular coordinate system when the rotation member 21 turns will be considered.

Locus of i Vector

Figure 17:
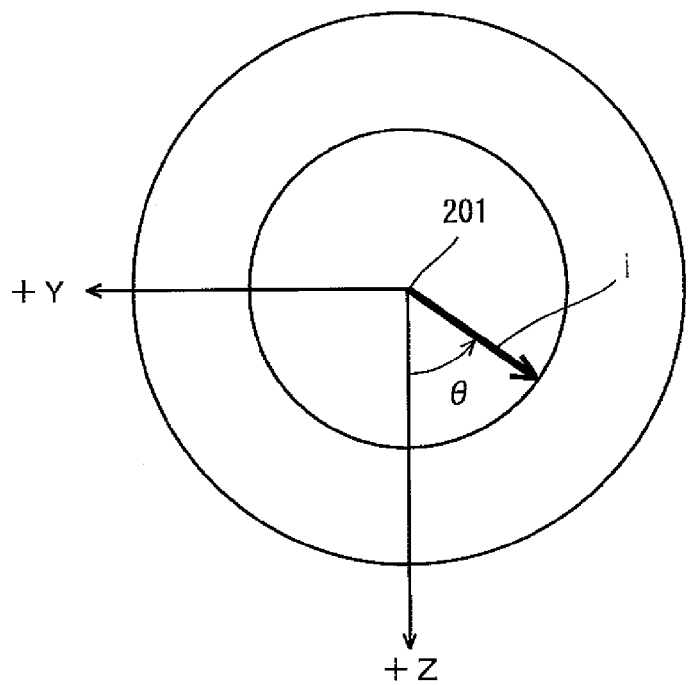
FIG. 17 is a schematic view showing a locus of an i vector in the XYZ rectangular coordinate system when the shaft is rotated.
Figure 18:
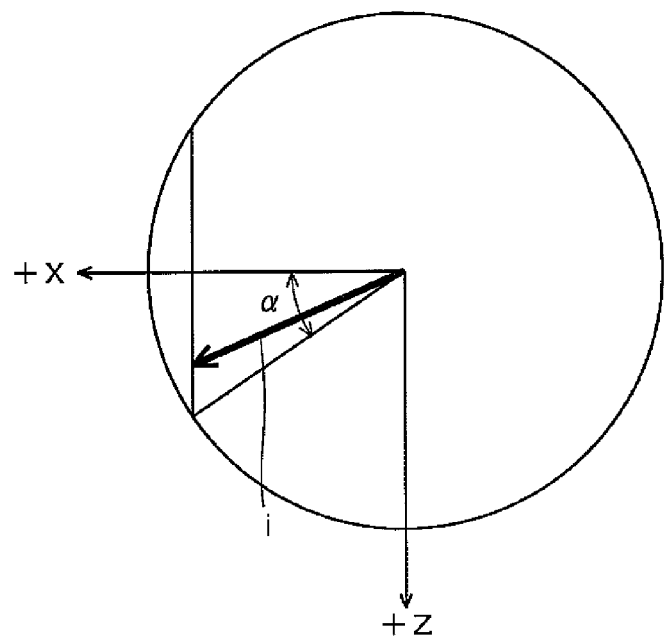
FIG. 18 is another schematic view showing a locus of an i vector in the XYZ rectangular coordinate system when the shaft is rotated.

FIGS. 17 and 18 are schematic views showing the locus of the i vector in the XYZ rectangular coordinate system when the shaft 20 rotates. FIG. 17 shows the locus of the i vector viewed in the −X direction and FIG. 18 shows the locus of the i vector viewed in the +Y direction. Referring to FIGS. 17 and 18, according to the embodiment, the main body 201 of the shaft 20 is provided in the center of a circle in FIG. 17. As viewed in the −X direction, when the shaft 20 is rotated at a rotation angle θ of 0 to 1440 deg (four full turns) anticlockwise around the X axis, the i vector rotates around the X axis as it is inclined at an angle α with respect to the X axis in the six-direction directing device 1. When α is 35.26 deg, the locus of the i vector in the XYZ coordinate system is given by the following Expression (5):

$$\begin{bmatrix} i_X \\ i_Y \\ i_Z \end{bmatrix} = \begin{bmatrix} \cos\alpha \\ -\sin\alpha\sin\theta \\ \sin\alpha\cos\theta \end{bmatrix} = \begin{bmatrix} \sqrt{\frac{2}{3}} \\ -\frac{1}{\sqrt{3}}\sin\theta \\ \frac{1}{\sqrt{3}}\cos\theta \end{bmatrix} \quad (5)$$

Locus of j Vector

Now, the locus of a j vector in the XYZ coordinate system when the rotation member 21 rotates will be considered.

The j vector is a unit vector of the y axis. Therefore, the j vector is directed in the directions in the order of the +U, −W, +V, −U, +W, and −V (and then to +U axis).

Here, unit vectors $UV_{+U}$, $UVD_{-W}$, $UV_{+V}$, $UV_{-U}$, $UV_{+W}$, and $UV_{-V}$ for the +U, −U, +V, −V, +W, and −W axes in the XYZ rectangular coordinate system are given by the following Expressions (6A) to (6F) based on FIGS. 11 and 12.

$$UV_{+U} = \begin{bmatrix} \sin\alpha \\ 0 \\ -\cos\alpha \end{bmatrix} = \begin{bmatrix} \frac{1}{\sqrt{3}} \\ 0 \\ -\sqrt{\frac{2}{3}} \end{bmatrix} = \begin{bmatrix} 0.577 \\ 0 \\ -0.816 \end{bmatrix} \quad (6A)$$

$$UV_{+V} = \begin{bmatrix} \sin\alpha \\ \frac{\sqrt{3}}{2}\cos\alpha \\ \frac{1}{2}\cos\alpha \end{bmatrix} = \begin{bmatrix} \frac{1}{\sqrt{3}} \\ \frac{1}{\sqrt{2}} \\ \frac{1}{\sqrt{6}} \end{bmatrix} = \begin{bmatrix} 0.577 \\ 0.707 \\ 0.408 \end{bmatrix} \quad (6B)$$

$$UV_{+W} = \begin{bmatrix} \sin\alpha \\ -\frac{\sqrt{3}}{2}\cos\alpha \\ \frac{1}{2}\cos\alpha \end{bmatrix} = \begin{bmatrix} \frac{1}{\sqrt{3}} \\ -\frac{1}{\sqrt{2}} \\ \frac{1}{\sqrt{6}} \end{bmatrix} = \begin{bmatrix} 0.577 \\ -0.707 \\ 0.408 \end{bmatrix} \quad (6C)$$

$$UV_{-U} = \begin{bmatrix} -\frac{1}{\sqrt{3}} \\ 0 \\ \sqrt{\frac{2}{3}} \end{bmatrix} = \begin{bmatrix} -0.577 \\ 0 \\ 0.816 \end{bmatrix} \quad (6D)$$

$$UV_{-V} = \begin{bmatrix} -\frac{1}{\sqrt{3}} \\ -\frac{1}{\sqrt{2}} \\ -\frac{1}{\sqrt{6}} \end{bmatrix} = \begin{bmatrix} -0.577 \\ -0.707 \\ -0.408 \end{bmatrix} \quad (6E)$$

$$UV_{-W} = \begin{bmatrix} -\frac{1}{\sqrt{3}} \\ \frac{1}{\sqrt{2}} \\ -\frac{1}{\sqrt{6}} \end{bmatrix} = \begin{bmatrix} -0.577 \\ 0.707 \\ -0.408 \end{bmatrix} \quad (6F)$$

Therefore, the locus of the j vector crosses the unit vectors $UV_{+U}$, $UV_{-W}$, $UV_{+V}$, $UV_{-U}$, $UV_{+W}$, and $UV_{-V}$ represented by Expressions (6A) to (6F).

Among curves on a spherical surface, the shortest curve that connects two points on the spherical surface is a great circle. Therefore, R1 to R6 shown in FIGS. 14 to 16 each correspond to a circular arc of a great circle on the spherical surface SS. A great circle is represented by a normal vector. Therefore, when the +y axis moves onto the −W axis from the +U axis on the locus R1, a normal vector CR1 of a great circle including the shortest locus R1 is represented by the outer product of Expressions (6A) and (6B), which is represented by Expression (7A). Similarly, a normal vector CR2 of a great circle including the locus R2 is expressed by the outer product of Expressions (6B) and (6C), which is represented by Expression (7B) and a normal vector CR3 of a great circle including the locus R3 is expressed by the outer product of Expressions (6C) and (6D), which is represented by Expression (7C). Similarly, normal vectors CR4 to CR6 including large circles including the loci R4 to R6 are represented by Expressions (7D) to (7F).

$$CR1 = \begin{bmatrix} n_X \\ n_Y \\ n_Z \end{bmatrix}_{+U-W} = \begin{bmatrix} -\sin\alpha \\ \frac{\sqrt{3}}{2}\cos\alpha \\ -\frac{1}{2}\cos\alpha \end{bmatrix} = \begin{bmatrix} -\frac{1}{\sqrt{3}} \\ -\frac{1}{\sqrt{2}} \\ -\frac{1}{\sqrt{6}} \end{bmatrix} = \begin{bmatrix} -0.577 \\ -0.707 \\ -0.408 \end{bmatrix} \quad (7A)$$

$$CR2 = \begin{bmatrix} n_X \\ n_Y \\ n_Z \end{bmatrix}_{-W+V} = \begin{bmatrix} \sin\alpha \\ 0 \\ -\cos\alpha \end{bmatrix} = \begin{bmatrix} \frac{1}{\sqrt{3}} \\ 0 \\ -\sqrt{\frac{2}{3}} \end{bmatrix} = \begin{bmatrix} -0.577 \\ 0 \\ -0.816 \end{bmatrix} \quad (7B)$$

$$CR3 = \begin{bmatrix} n_X \\ n_Y \\ n_Z \end{bmatrix}_{+V-U} = \begin{bmatrix} -\sin\alpha \\ \frac{\sqrt{3}}{2}\cos\alpha \\ -\frac{1}{2}\cos\alpha \end{bmatrix} = \begin{bmatrix} -\frac{1}{\sqrt{3}} \\ \frac{1}{\sqrt{2}} \\ -\frac{1}{\sqrt{6}} \end{bmatrix} = \begin{bmatrix} -0.577 \\ 0.707 \\ -0.408 \end{bmatrix} \quad (7C)$$

$$CR4 = \begin{bmatrix} n_X \\ n_Y \\ n_Z \end{bmatrix}_{-U+W} = \begin{bmatrix} \sin\alpha \\ \frac{\sqrt{3}}{2}\cos\alpha \\ \frac{1}{2}\cos\alpha \end{bmatrix} = \begin{bmatrix} \frac{1}{\sqrt{3}} \\ \frac{1}{\sqrt{2}} \\ \frac{1}{\sqrt{6}} \end{bmatrix} = \begin{bmatrix} 0.577 \\ 0.707 \\ 0.408 \end{bmatrix} \quad (7D)$$

$$CR5 = \begin{bmatrix} n_X \\ n_Y \\ n_Z \end{bmatrix}_{+W-V} = \begin{bmatrix} -\sin\alpha \\ 0 \\ \cos\alpha \end{bmatrix} = \begin{bmatrix} -\frac{1}{\sqrt{3}} \\ 0 \\ \sqrt{\frac{2}{3}} \end{bmatrix} = \begin{bmatrix} -0.577 \\ 0 \\ 0.816 \end{bmatrix} \quad (7E)$$

$$CR6 = \begin{bmatrix} n_X \\ n_Y \\ n_Z \end{bmatrix}_{-V+U} = \begin{bmatrix} \sin\alpha \\ -\frac{\sqrt{3}}{2}\cos\alpha \\ \frac{1}{2}\cos\alpha \end{bmatrix} = \begin{bmatrix} \frac{1}{\sqrt{3}} \\ -\frac{1}{\sqrt{2}} \\ \frac{1}{\sqrt{6}} \end{bmatrix} = \begin{bmatrix} 0.577 \\ -0.707 \\ 0.408 \end{bmatrix} \quad (7F)$$

The j vector is expressed by the outer products of the i vector and the normal vectors CR1 to CR6 of large circles as expressed by Expression (8).

$$\begin{bmatrix} j_X \\ j_Y \\ j_Z \end{bmatrix} = \begin{bmatrix} i_X \\ i_Y \\ i_Z \end{bmatrix} \times \begin{bmatrix} n_X \\ n_Y \\ n_Z \end{bmatrix} = \frac{1}{|i \times n|} \begin{bmatrix} i_Y n_Z - i_Z n_Y \\ i_Z n_X - i_X n_Z \\ i_X n_Y - i_Y n_X \end{bmatrix} \quad (8)$$

Therefore, the loci R1 to R6 of the j vector that passes the unit vectors $UV_{+U}$, $UV_{-W}$, $UV_{-U}$, $UV_{+W}$, and $UV_{-V}$ for the axes +U, −W, +V, −U, +W, and −V axes are represented as follows.

A unit vector jR1 of the locus R1 that connects a unit vector $UV_{+U}$ (+U axis) and a unit vector $UV_{-W}$ (−W axis) is represented by Expression (9) based on Expressions (5), (7A), and (8). Note that the rotation angle θ (of the shaft 20) in the locus R1 is from 0 to 240 deg.

$$jR1 = \begin{bmatrix} j_X \\ j_Y \\ j_Z \end{bmatrix}_{+U-W} = \quad (9)$$

$$\frac{1}{|i \times n|_{+U-W}} \begin{bmatrix} \sqrt{\frac{2}{3}} \\ -\frac{\sin\theta}{\sqrt{3}} \\ \frac{\cos\theta}{\sqrt{3}} \end{bmatrix} \times \begin{bmatrix} -\frac{1}{\sqrt{3}} \\ -\frac{1}{\sqrt{2}} \\ -\frac{1}{\sqrt{6}} \end{bmatrix} = \frac{1}{a_{12}} \begin{bmatrix} \frac{\sqrt{3}\cos\theta + \sin\theta}{3\sqrt{2}} \\ -\frac{\cos\theta - 1}{3} \\ -\frac{\sin\theta + \sqrt{3}}{3} \end{bmatrix}$$

$$a_{12} = \sqrt{\frac{(\sqrt{3}\cos\theta + \sin\theta)^2}{18} + \frac{(\cos\theta - 1)^2}{9} + \frac{(\sin\theta + \sqrt{3})^2}{9}}$$

Similarly, a unit vector jR2 of the locus R2 that connects the unit vector $UV_{-W}$ (−W axis) and a unit vector $UV_{+V}$ (+V axis) is represented by Expression (10) based on Expressions (5), (7B), and (8). The rotation angle θ in the locus R2 is from 240 to 480 deg.

$$jR2 = \quad (10)$$

$$\begin{bmatrix} j_X \\ j_Y \\ j_Z \end{bmatrix}_{-W+V} = \frac{1}{|i \times n|_{-W+V}} \begin{bmatrix} \sqrt{\frac{2}{3}} \\ -\frac{\sin\theta}{\sqrt{3}} \\ \frac{\cos\theta}{\sqrt{3}} \end{bmatrix} \times \begin{bmatrix} \frac{1}{\sqrt{3}} \\ 0 \\ -\sqrt{\frac{2}{3}} \end{bmatrix} = \frac{1}{a_{23}} \begin{bmatrix} \frac{\sqrt{2}\sin\theta}{3} \\ \frac{\cos\theta + 2}{3} \\ \frac{\sin\theta}{3} \end{bmatrix}$$

$$a_{23} = \sqrt{\frac{(\cos\theta + 2)^2}{9} + \frac{\sin^2\theta}{3}}$$

A unit vector jR3 of the locus R3 that connects the unit vector $UV_{+V}$ (+V axis) and a unit vector $UV_{-U}$ (−U axis) is represented by Expression (11) based on Expressions (5), (7C), and (8). The rotation angle θ in the locus R3 is from 480 to 720 deg.

$$jR3 = \begin{bmatrix} j_X \\ j_Y \\ j_Z \end{bmatrix}_{+V-U} = \quad (11)$$

$$\frac{1}{|i \times n|_{+V-U}} \begin{bmatrix} \sqrt{\frac{2}{3}} \\ -\frac{\sin\theta}{\sqrt{3}} \\ \frac{\cos\theta}{\sqrt{3}} \end{bmatrix} \times \begin{bmatrix} -\frac{1}{\sqrt{3}} \\ \frac{1}{\sqrt{2}} \\ -\frac{1}{\sqrt{6}} \end{bmatrix} = \frac{1}{a_{34}} \begin{bmatrix} -\frac{\sqrt{3}\cos\theta - \sin\theta}{3\sqrt{2}} \\ -\frac{\cos\theta - 1}{3} \\ -\frac{\sin\theta - \sqrt{3}}{3} \end{bmatrix}$$

$$a_{34} = \sqrt{\frac{(\sqrt{3}\cos\theta - \sin\theta)^2}{18} + \frac{(\cos\theta - 1)^2}{9} + \frac{(\sin\theta - \sqrt{3})^2}{9}}$$

A unit vector jR4 of the locus R4 that connects the unit vector $UV_{-U}$ (−U axis) and a unit vector $UV_{+W}$ (+W axis) is represented by Expression (12) based on Expressions (5), (7D), and (8). The rotation angle θ in the locus R4 is from 720 to 960 deg.

$$jR4 = \begin{bmatrix} j_X \\ j_Y \\ j_Z \end{bmatrix}_{-U+W} = \quad (12)$$

$$\frac{1}{|i \times n|_{-U+W}} \begin{bmatrix} \sqrt{\frac{2}{3}} \\ -\frac{\sin\theta}{\sqrt{3}} \\ \frac{\cos\theta}{\sqrt{3}} \end{bmatrix} \times \begin{bmatrix} \frac{1}{\sqrt{3}} \\ \frac{1}{\sqrt{2}} \\ \frac{1}{\sqrt{6}} \end{bmatrix} = \frac{1}{a_{45}} \begin{bmatrix} -\frac{\sqrt{3}\cos\theta + \sin\theta}{3\sqrt{2}} \\ \frac{\cos\theta - 1}{3} \\ \frac{\sin\theta + \sqrt{3}}{3} \end{bmatrix}$$

$$a_{45} = \sqrt{\frac{(\sqrt{3}\cos\theta + \sin\theta)^2}{18} + \frac{(\cos\theta - 1)^2}{9} + \frac{(\sin\theta + \sqrt{3})^2}{9}}$$

A unit vector jR5 of the locus R5 that connects the unit vector $UV_{+W}$ (+W axis) and a unit vector $UV_{-V}$ (−V axis) is represented by Expression (13) based on Expressions (5), (7E), and (8). The rotation angle θ in the locus R5 is from 960 to 1200 deg.

$$jR5 = \begin{bmatrix} j_X \\ j_Y \\ j_Z \end{bmatrix}_{+W-V} = \quad (13)$$

$$\frac{1}{|i \times n|_{+W-V}} \begin{bmatrix} \sqrt{\frac{2}{3}} \\ -\frac{\sin\theta}{\sqrt{3}} \\ \frac{\cos\theta}{\sqrt{3}} \end{bmatrix} \times \begin{bmatrix} -\frac{1}{\sqrt{3}} \\ 0 \\ \sqrt{\frac{2}{3}} \end{bmatrix} = \frac{1}{a_{56}} \begin{bmatrix} -\frac{\sqrt{2}\sin\theta}{3} \\ -\frac{\cos\theta + 2}{3} \\ -\frac{\sin\theta}{3} \end{bmatrix}$$

$$a_{56} = \sqrt{\frac{(\cos\theta + 2)^2}{9} + \frac{\sin^2\theta}{3}}$$

A unit vector jR6 of the locus R6 that connects the unit vector $UV_{-V}$ (−V axis) and the unit vector $UV_{+U}$ (+U axis) is represented by Expression (14) based on Expressions (5) and (7F). The rotation angle θ in the locus R6 is from 1200 to 1440 deg.

$$jR6 = \begin{bmatrix} j_X \\ j_Y \\ j_Z \end{bmatrix}_{-V+U} = \quad (14)$$

$$\frac{1}{|i \times n|_{-V+U}} \begin{bmatrix} \sqrt{\frac{2}{3}} \\ -\frac{\sin\theta}{\sqrt{3}} \\ \frac{\cos\theta}{\sqrt{3}} \end{bmatrix} \times \begin{bmatrix} \frac{1}{\sqrt{3}} \\ -\frac{1}{\sqrt{2}} \\ \frac{1}{\sqrt{6}} \end{bmatrix} = \frac{1}{a_{61}} \begin{bmatrix} \frac{\sqrt{3}\cos\theta - \sin\theta}{3\sqrt{2}} \\ \frac{\cos\theta - 1}{3} \\ \frac{\sin\theta - \sqrt{3}}{3} \end{bmatrix}$$

$$a_{61} = \sqrt{\frac{(\sqrt{3}\cos\theta - \sin\theta)^2}{18} + \frac{(\cos\theta - 1)^2}{9} + \frac{(\sin\theta - \sqrt{3})^2}{9}}$$

As in the foregoing, the unit vectors jR1 to jR6 of the loci R1 to R6 are represented by Expressions (9) to (14). The +y axis returns to the rotation start position by rotating the shaft 20 by 0 to 1440 deg (four full turns) from the rotation start position.

Locus of k Vector

The vector component of the k vector in the XYZ coordinate system is obtained by the outer product of the i vector and the j vector as expressed by Expression (15).

$$\begin{bmatrix} k_X \\ k_Y \\ k_Z \end{bmatrix} = \begin{bmatrix} i_X \\ i_Y \\ i_Z \end{bmatrix} \times \begin{bmatrix} j_X \\ j_Y \\ j_Z \end{bmatrix} = \begin{bmatrix} i_Y j_Z - i_Z j_Y \\ i_Z j_X - i_X j_Z \\ i_X j_Y - i_Y j_X \end{bmatrix} \quad (15)$$

As described above, the locus of the j vector is divided into six (R1 to R6), and therefore the locus of the k vector is also divided into six (R1 to R6). More specifically, the k vector in the locus R1 is obtained as the outer product of Expressions (5) and (9) based on Expression (15). The k vector component in the locus R2 is obtained as the outer product of Expressions (5) and (10). Similarly, the k vector components in the loci R3 to R6 are obtained as the outer products of Expression (5) and Expressions (11) to (14)

A coordinate transformation matrix represented by Expression (3) is obtained based on the obtained vector components of the i, j, and k vectors. More specifically, the coordinate transformation matrix in the locus R1 is represented by Expression (16) based on Expressions (5), (9), and (15).

$$\begin{bmatrix} i_X & j_X & k_X \\ i_Y & j_Y & k_Y \\ i_Z & j_Z & k_Z \end{bmatrix}_{+U-W} = \begin{bmatrix} \sqrt{\frac{2}{3}} & \frac{\sqrt{3}\cos\theta + \sin\theta}{3\sqrt{2}\, a_{12}} & \frac{\sin\theta}{\sqrt{3}} \cdot \frac{\sin\theta + \sqrt{3}}{3a_{12}} + \frac{\cos\theta}{\sqrt{3}} \cdot \frac{\cos\theta - 1}{3a_{12}} \\ -\frac{\sin\theta}{\sqrt{3}} & -\frac{\cos\theta - 1}{3a_{12}} & \frac{\cos\theta}{\sqrt{3}} \cdot \frac{\sqrt{3}\cos\theta + \sin\theta}{3\sqrt{2}\, a_{12}} + \sqrt{\frac{2}{3}} \cdot \frac{\sin\theta + \sqrt{3}}{3a_{12}} \\ \frac{\cos\theta}{\sqrt{3}} & -\frac{\sin\theta + \sqrt{3}}{3a_{12}} & -\sqrt{\frac{2}{3}} \cdot \frac{\cos\theta - 1}{3a_{12}} + \frac{\sin\theta}{\sqrt{3}} \cdot \frac{\sqrt{3}\cos\theta + \sin\theta}{3\sqrt{2}\, a_{12}} \end{bmatrix} \quad (16)$$

$$a_{12} = \sqrt{\frac{(\sqrt{3}\cos\theta + \sin\theta)^2}{18} + \frac{(\cos\theta - 1)^2}{9} + \frac{(\sin\theta + \sqrt{3})^2}{9}}$$

Similarly, a coordinate transformation matrix for the locus R2 is represented by Expression (17) based on Expressions (5), (10), and (15).

$$\begin{bmatrix} i_X & j_X & k_X \\ i_Y & j_Y & k_Y \\ i_Z & j_Z & k_Z \end{bmatrix}_{-W+V} = \tag{17}$$

$$\begin{bmatrix} \sqrt{\frac{2}{3}} & \frac{\sqrt{2}\sin\theta}{3a_{23}} & -\frac{\sin\theta}{\sqrt{3}} \cdot \frac{\sin\theta}{3a_{23}} + \frac{\cos\theta}{\sqrt{3}} \cdot \frac{\cos\theta+2}{3a_{23}} \\ -\frac{\sin\theta}{\sqrt{3}} & \frac{\cos\theta+2}{3a_{23}} & \frac{\cos\theta}{\sqrt{3}} \cdot \frac{\sqrt{2}\sin\theta}{3a_{23}} - \sqrt{\frac{2}{3}} \cdot \frac{\sin\theta}{3a_{23}} \\ \frac{\cos\theta}{\sqrt{3}} & \frac{\sin\theta}{3a_{23}} & \sqrt{\frac{2}{3}} \cdot \frac{\cos\theta+2}{3a_{23}} + \frac{\sin\theta}{\sqrt{3}} \cdot \frac{\sqrt{2}\sin\theta}{3a_{23}} \end{bmatrix}$$

$$a_{23} = \sqrt{\frac{(\cos\theta+2)^2}{9} + \frac{\sin^2\theta}{3}}$$

A coordinate transformation matrix for the locus R3 is represented by Expression (18) based on Expressions (5), (11), and (15).

$$\begin{bmatrix} i_X & j_X & k_X \\ i_Y & j_Y & k_Y \\ i_Z & j_Z & k_Z \end{bmatrix}_{+V-U} = \begin{bmatrix} \sqrt{\frac{2}{3}} & -\frac{\sqrt{3}\cos\theta-\sin\theta}{3\sqrt{2}\,a_{34}} & \frac{\sin\theta}{\sqrt{3}} \cdot \frac{\sin\theta-\sqrt{3}}{3a_{34}} + \frac{\cos\theta}{\sqrt{3}} \cdot \frac{\cos\theta-1}{3a_{34}} \\ -\frac{\sin\theta}{\sqrt{3}} & -\frac{\cos\theta-1}{3a_{34}} & -\frac{\cos\theta}{\sqrt{3}} \cdot \frac{\sqrt{3}\cos\theta-\sin\theta}{3\sqrt{2}\,a_{34}} + \sqrt{\frac{2}{3}} \cdot \frac{\sin\theta-\sqrt{3}}{3a_{34}} \\ \frac{\cos\theta}{\sqrt{3}} & -\frac{\sin\theta-\sqrt{3}}{3a_{34}} & -\sqrt{\frac{2}{3}} \cdot \frac{\cos\theta-1}{3a_{34}} - \frac{\sin\theta}{\sqrt{3}} \cdot \frac{\sqrt{3}\cos\theta-\sin\theta}{3\sqrt{2}\,a_{34}} \end{bmatrix} \tag{18}$$

$$a_{34} = \sqrt{\frac{\left(\sqrt{3}\cos\theta-\sin\theta\right)^2}{18} + \frac{(\cos\theta-1)^2}{9} + \frac{\left(\sin\theta-\sqrt{3}\right)^2}{9}}$$

A coordinate transformation matrix for the locus R4 is represented by Expression (19) based on Expressions (5), (12), and (15).

$$\begin{bmatrix} i_X & j_X & k_X \\ i_Y & j_Y & k_Y \\ i_Z & j_Z & k_Z \end{bmatrix}_{-U+W} = \begin{bmatrix} \sqrt{\frac{2}{3}} & -\frac{\sqrt{3}\cos\theta+\sin\theta}{3\sqrt{2}\,a_{45}} & -\frac{\sin\theta}{\sqrt{3}} \cdot \frac{\sin\theta+\sqrt{3}}{3a_{45}} - \frac{\cos\theta}{\sqrt{3}} \cdot \frac{\cos\theta-1}{3a_{45}} \\ -\frac{\sin\theta}{\sqrt{3}} & \frac{\cos\theta-1}{3a_{45}} & -\frac{\cos\theta}{\sqrt{3}} \cdot \frac{\sqrt{3}\cos\theta+\sin\theta}{3\sqrt{2}\,a_{45}} - \sqrt{\frac{2}{3}} \cdot \frac{\sin\theta+\sqrt{3}}{3a_{45}} \\ \frac{\cos\theta}{\sqrt{3}} & \frac{\sin\theta+\sqrt{3}}{3a_{45}} & \sqrt{\frac{2}{3}} \cdot \frac{\cos\theta-1}{3a_{45}} - \frac{\sin\theta}{\sqrt{3}} \cdot \frac{\sqrt{3}\cos\theta+\sin\theta}{3\sqrt{2}\,a_{45}} \end{bmatrix} \tag{19}$$

$$a_{45} = \sqrt{\frac{\left(\sqrt{3}\cos\theta+\sin\theta\right)^2}{18} + \frac{(\cos\theta-1)^2}{9} + \frac{\left(\sin\theta+\sqrt{3}\right)^2}{9}}$$

A coordinate transformation matrix for the locus R5 is represented by Expression (20) based on Expressions (5), (13), and (15).

$$\begin{bmatrix} i_X & j_X & k_X \\ i_Y & j_Y & k_Y \\ i_Z & j_Z & k_Z \end{bmatrix}_{+W-V} = \tag{20}$$

$$\begin{bmatrix} \sqrt{\frac{2}{3}} & -\frac{\sqrt{2}\sin\theta}{3a_{56}} & \frac{\sin\theta}{\sqrt{3}} \cdot \frac{\sin\theta}{3a_{56}} - \frac{\cos\theta}{\sqrt{3}} \cdot \frac{\cos\theta+2}{3a_{56}} \\ -\frac{\sin\theta}{\sqrt{3}} & -\frac{\cos\theta+2}{3a_{56}} & -\frac{\cos\theta}{\sqrt{3}} \cdot \frac{\sqrt{2}\sin\theta}{3a_{56}} + \sqrt{\frac{2}{3}} \cdot \frac{\sin\theta}{3a_{56}} \\ \frac{\cos\theta}{\sqrt{3}} & -\frac{\sin\theta}{3a_{56}} & -\sqrt{\frac{2}{3}} \cdot \frac{\cos\theta+2}{3a_{56}} - \frac{\sin\theta}{\sqrt{3}} \cdot \frac{\sqrt{2}\sin\theta}{3a_{56}} \end{bmatrix}$$

$$a_{56} = \sqrt{\frac{(\cos\theta+2)^2}{9} + \frac{\sin^2\theta}{3}}$$

Finally, a coordinate transformation matrix for the locus R6 is represented by Expression (21) based on Expressions (5), (14), and (15).

$$\begin{bmatrix} i_X & j_X & k_X \\ i_Y & j_Y & k_Y \\ i_Z & j_Z & k_Z \end{bmatrix}_{-V+U} = \begin{bmatrix} \sqrt{\frac{2}{3}} & \frac{\sqrt{3}\cos\theta - \sin\theta}{3\sqrt{2}\,a_{61}} & -\frac{\sin\theta}{\sqrt{3}} \cdot \frac{\sin\theta - \sqrt{3}}{3a_{61}} - \frac{\cos\theta}{\sqrt{3}} \cdot \frac{\cos\theta - 1}{3a_{61}} \\ -\frac{\sin\theta}{\sqrt{3}} & \frac{\cos\theta - 1}{3a_{61}} & \frac{\cos\theta}{\sqrt{3}} \cdot \frac{\sqrt{3}\cos\theta - \sin\theta}{3\sqrt{2}\,a_{61}} - \sqrt{\frac{2}{3}} \cdot \frac{\sin\theta - \sqrt{3}}{3a_{61}} \\ \frac{\cos\theta}{\sqrt{3}} & \frac{\sin\theta - \sqrt{3}}{3a_{61}} & \sqrt{\frac{2}{3}} \cdot \frac{\cos\theta - 1}{3a_{61}} + \frac{\sin\theta}{\sqrt{3}} \cdot \frac{\sqrt{3}\cos\theta - \sin\theta}{3\sqrt{2}\,a_{61}} \end{bmatrix} \quad (21)$$

$$a_{61} = \sqrt{\frac{(\sqrt{3}\cos\theta - \sin\theta)^2}{18} + \frac{(\cos\theta - 1)^2}{9} + \frac{(\sin\theta - \sqrt{3})^2}{9}}$$

As in the foregoing, the loci R1 to R6 during the rotation of the shaft 20 are defined by the i, j, and k vectors in the XYZ rectangular coordinate system. As described above, the rotation member 21 rotates in response to the rotation of the shaft 20 while it is supported by the plurality of guide members 4A to 4C. The rotation member 21 rotates according to the shape of the orbit portion OP because the guide members 4 are in contact with the orbit portion OP of the rotation member 21. Therefore, the orbit portion OP is formed to have such a shape that the +y axis is directed to six axes (+U, −W, +V, −U, +W, and −V axes) as the +y axis moves on the loci R1 to R6. The shape of a preferable orbit portion OP is as follows.

Shape of Orbit Portion OP

Figure 19:
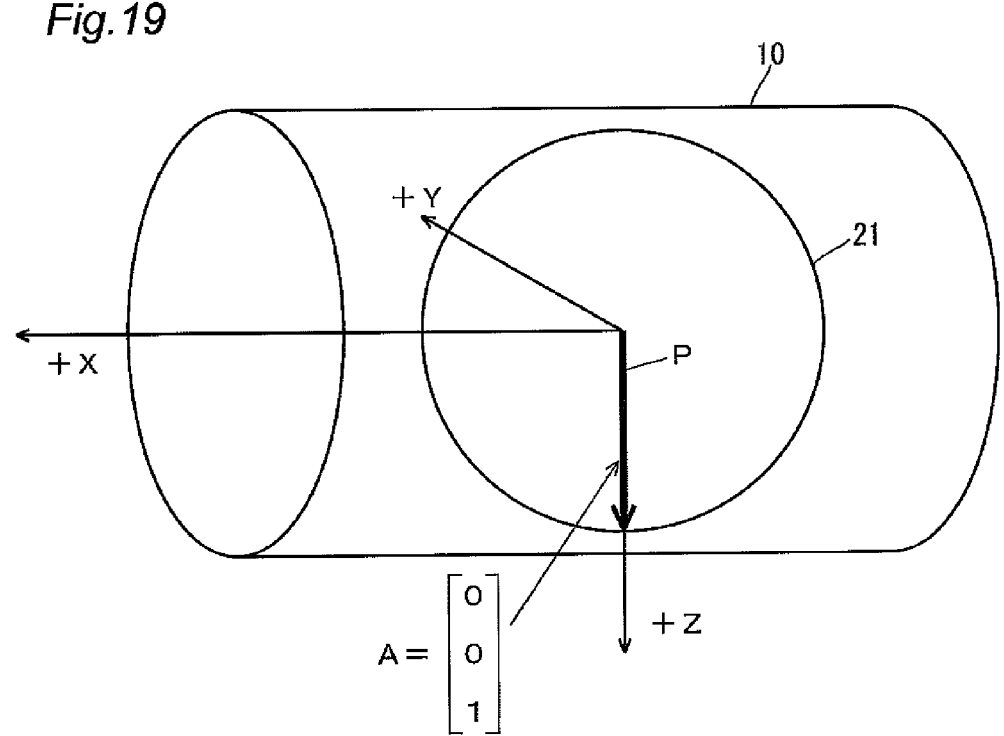
FIG. 19 is a schematic view of the case of the six-direction directing device and the rotation member.

FIG. 19 is a schematic view of the case 10 and the rotation member 21 in the six-direction directing device 1. As shown in FIG. 19, it is assumed that a pen P is fixed on the +Z axis where the guide member 4A is provided. A unit vector A of the pen P is represented by Expression (22) as shown in FIG. 19.

$$A = \begin{bmatrix} 0 \\ 0 \\ 1 \end{bmatrix} \quad (22)$$

The pen P is fixed on the Z axis, and therefore it is assumed that the pen P does not move if the rotation member 21 rotates. When the rotation member 21 provided in the rotation start position shown in FIG. 13 starts to rotate and the +y axis starts to move from the +U axis, moves sequentially on the above-described loci R1 to R6 and returns to the +U axis, the locus of the pen P drawn on the surface of the rotation member 21 corresponds to the shape of a preferable orbit portion OP. Now, the shape of the orbit portion OP will be described.

When the rotation member 21 rotates, a locus drawn by the pen P on the spherical surface SS of the main body 210 is represented by Expression (23) using the coordinate transformation matrix according to Expression (4).

$$\begin{bmatrix} x \\ y \\ z \end{bmatrix} = \begin{bmatrix} i_X & i_Y & i_Z \\ j_X & j_Y & j_Z \\ k_X & k_Y & k_Z \end{bmatrix} \begin{bmatrix} 0 \\ 0 \\ 1 \end{bmatrix} = \begin{bmatrix} i_Z \\ j_Z \\ k_Z \end{bmatrix} \quad (23)$$

The coordinate transformation matrix by Expression (4) is the inverse matrix (transposed matrix) of the coordinate transformation matrix by Expression (3). Therefore, a locus drawn by the pen P on the spherical surface SS or a unit vector indicating the orbit of the orbit portion OP is expressed as follows for each of the loci R1 to R6. When the +y axis moves on the locus R1 (by a rotation angle of 0 to 240 deg), a unit vector of a locus r1 of the pen P (or vector components $i_z$, $j_z$, and $k_z$ in Expression (23)) is represented by Expression (24) based on Expressions (23), (3), and (16).

$$\begin{bmatrix} i_Z \\ j_Z \\ k_Z \end{bmatrix} = \begin{bmatrix} \dfrac{\cos\theta}{\sqrt{3}} \\ -\dfrac{\sin\theta + \sqrt{3}}{3a_{12}} \\ \dfrac{-2(\cos\theta - 1) + \sin\theta(\sqrt{3}\cos\theta + \sin\theta)}{3\sqrt{6}\,a_{12}} \end{bmatrix} \quad (24)$$

$$a_{12} = \sqrt{\frac{(\sqrt{3}\cos\theta + \sin\theta)^2}{18} + \frac{(\cos\theta - 1)^2}{9} + \frac{(\sin\theta + \sqrt{3})^2}{9}}$$

Similarly, when the y axis moves on the locus R2 (by a rotation angle of 240 to 480 deg), a unit vector of a locus r2 of the pen P is represented by Expression (25) based on Expressions (23), (3), and (17).

$$\begin{bmatrix} i_Z \\ j_Z \\ k_Z \end{bmatrix} = \begin{bmatrix} \dfrac{\cos\theta}{\sqrt{3}} \\ \dfrac{\sin\theta}{3a_{23}} \\ \dfrac{\sqrt{2}\,(\cos\theta + 2 + \sin^2\theta)}{3\sqrt{3}\,a_{23}} \end{bmatrix} \quad (25)$$

$$a_{23} = \sqrt{\frac{(\cos\theta + 2)^2}{9} + \frac{\sin^2\theta}{3}}$$

When the +y axis moves on the locus R3 (by a rotation angle of 480 to 720 deg), a unit vector of a locus r3 of the pen P is represented by Expression (26) based on Expressions (23), (3), and (17).

$$\begin{bmatrix} i_Z \\ j_Z \\ k_Z \end{bmatrix} = \begin{bmatrix} \dfrac{\cos\theta}{\sqrt{3}} \\ -\dfrac{\sin\theta - \sqrt{3}}{3a_{34}} \\ -\dfrac{2(\cos\theta - 1) + \sin\theta(\sqrt{3}\cos\theta - \sin\theta)}{3\sqrt{6}\,a_{34}} \end{bmatrix} \quad (26)$$

-continued $$a_{34} = \sqrt{\frac{(\sqrt{3}\cos\theta - \sin\theta)^2}{18} + \frac{(\cos\theta - 1)^2}{9} + \frac{(\sin\theta - \sqrt{3})^2}{9}}$$

When the +y axis moves on the locus R4 (by a rotation angle of 720 to 960 deg), a unit vector of a locus r4 of the pen P is represented by Expression (27) based on Expressions (23), (3), and (17).

$$\begin{bmatrix} i_Z \\ j_Z \\ k_Z \end{bmatrix} = \begin{bmatrix} \dfrac{\cos\theta}{\sqrt{3}} \\ \dfrac{\sin\theta + \sqrt{3}}{3a_{45}} \\ \dfrac{2(\cos\theta - 1) - \sin\theta(\sqrt{3}\cos\theta + \sin\theta)}{3\sqrt{6}\,a_{45}} \end{bmatrix} \quad (27)$$

$$a_{45} = \sqrt{\frac{(\sqrt{3}\cos\theta + \sin\theta)^2}{8} + \frac{(\cos\theta - 1)^2}{9} + \frac{(\sin\theta + \sqrt{3})^2}{9}}$$

When the +y axis moves on the locus R5 (by a rotation angle of 960 to 1200 deg), a unit vector of a locus r5 of the pen P is represented by Expression (28) based on Expressions (23), (3), and (18).

$$\begin{bmatrix} i_Z \\ j_Z \\ k_Z \end{bmatrix}_{56} = \begin{bmatrix} \dfrac{\cos\theta}{\sqrt{3}} \\ -\dfrac{\sin\theta}{3a_{56}} \\ -\dfrac{\sqrt{2}\,(\cos\theta + 2 + \sin^2\theta)}{3\sqrt{3}\,a_{56}} \end{bmatrix} \quad (28)$$

$$a_{56} = \sqrt{\frac{(\cos\theta + 2)^2}{9} + \frac{\sin^2\theta}{3}}$$

When the +y axis moves on the locus R6 (by a rotation angle of 1200 to 1440 deg), a unit vector of a locus r6 of the pen P is represented by Expression (29) based on Expressions (23), (3), and (18).

$$\begin{bmatrix} i_Z \\ j_Z \\ k_Z \end{bmatrix}_{61} = \begin{bmatrix} \dfrac{\cos\theta}{\sqrt{3}} \\ \dfrac{\sin\theta - \sqrt{3}}{3a_{61}} \\ \dfrac{2(\cos\theta - 1) + \sin\theta(\sqrt{3}\cos\theta - \sin\theta)}{3\sqrt{6}\,a_{61}} \end{bmatrix} \quad (29)$$

$$a_{61} = \sqrt{\frac{(\sqrt{3}\cos\theta - \sin\theta)^2}{18} + \frac{(\cos\theta - 1)^2}{9} + \frac{(\sin\theta - \sqrt{3})^2}{9}}$$

The shape of the orbit portion OP corresponding to the loci R1 to R6 is represented by the loci r1 to r6 drawn by the pen P, in other words, by the unit vectors according to the above-described Expressions (24) to (29). The shape of the orbit portion OP is as shown in FIGS. 5 to 8. Referring to FIGS. 5 to 8, the orbit portion OP is a zigzag shaped groove that extends around the x axis and has four mountain-like portions M1 to M4 with ridges on the +x axis and four valley-like portions V1 to V4 with ridges on the −X side. In this example, as shown in FIG. 5, the mountain-like portions M1 to M4 are provided at intervals of 90 deg around the x axis from the +y axis and the valley-like portions V1 to V4 are provided alternately between adjacent mountain-like portions M1 to M4.

Crossing points P1 to P6 of the +U, −W, +V, −U, +W, −V, and +U axes and the orbit portion OP can be obtained using Expressions (24) to (29). More specifically, substitution of a rotation angle θ of 0 deg in Expression (24) results in a unit vector of the crossing point P1 of the orbit portion OP and the +U axis. The crossing point P1 is given by Expression (30).

$$P1 = \begin{bmatrix} x \\ y \\ z \end{bmatrix} = \begin{bmatrix} \dfrac{1}{\sqrt{3}} \\ -\sqrt{\dfrac{2}{3}} \\ 0 \end{bmatrix} = \begin{bmatrix} 0.577 \\ -0.816 \\ 0 \end{bmatrix} \quad (30)$$

Similarly, a unit vector of the crossing point P2 of the orbit portion OP and −W axis is given by Expression (31) obtained by substituting a rotation angle θ of 240 deg in Expression (24) or (25).

$$P2 = \begin{bmatrix} x \\ y \\ z \end{bmatrix} = \begin{bmatrix} -\dfrac{1}{2\sqrt{3}} \\ -\dfrac{1}{\sqrt{6}} \\ \dfrac{\sqrt{3}}{2} \end{bmatrix} = \begin{bmatrix} -0.289 \\ -0.408 \\ 0.866 \end{bmatrix} \quad (31)$$

A unit vector of the crossing point P3 of the orbit portion OP and the +V axis is given by Expression (32) obtained by substituting a rotation angle θ of 480 deg in Expression (25) or (26).

$$P3 = \begin{bmatrix} x \\ y \\ z \end{bmatrix} = \begin{bmatrix} -\dfrac{1}{2\sqrt{3}} \\ \dfrac{1}{\sqrt{6}} \\ \dfrac{\sqrt{3}}{2} \end{bmatrix} = \begin{bmatrix} -0.289 \\ 0.408 \\ 0.866 \end{bmatrix} \quad (32)$$

A unit vector of the crossing point P4 of the orbit portion OP and the −U axis is given by Expression (33) obtained by substituting a rotation angle θ of 720 deg in Expression (26) or (27).

$$P4 = \begin{bmatrix} x \\ y \\ z \end{bmatrix} = \begin{bmatrix} \dfrac{1}{\sqrt{3}} \\ \sqrt{\dfrac{2}{3}} \\ 0 \end{bmatrix} = \begin{bmatrix} 0.577 \\ 0.816 \\ 0 \end{bmatrix} \quad (33)$$

A unit vector of the crossing point P5 of the orbit portion OP and the +W axis is given by Expression (34) obtained by substituting a rotation angle θ of 960 deg in Expression (27) or (28).

$$P5 = \begin{bmatrix} x \\ y \\ z \end{bmatrix} = \begin{bmatrix} -\frac{1}{2\sqrt{3}} \\ \frac{1}{\sqrt{6}} \\ -\frac{\sqrt{3}}{2} \end{bmatrix} = \begin{bmatrix} -0.289 \\ 0.408 \\ -0.866 \end{bmatrix} \quad (34)$$

A unit vector of the crossing point P6 of the orbit portion OP and the −V axis is given by Expression (35) obtained by substituting a rotation angle θ of 1200 deg in Expression (28) or (29).

$$P6 = \begin{bmatrix} x \\ y \\ z \end{bmatrix} = \begin{bmatrix} -\frac{1}{2\sqrt{3}} \\ -\frac{1}{\sqrt{6}} \\ -\frac{\sqrt{3}}{2} \end{bmatrix} = \begin{bmatrix} -0.289 \\ -0.408 \\ -0.866 \end{bmatrix} \quad (35)$$

Figure 20:
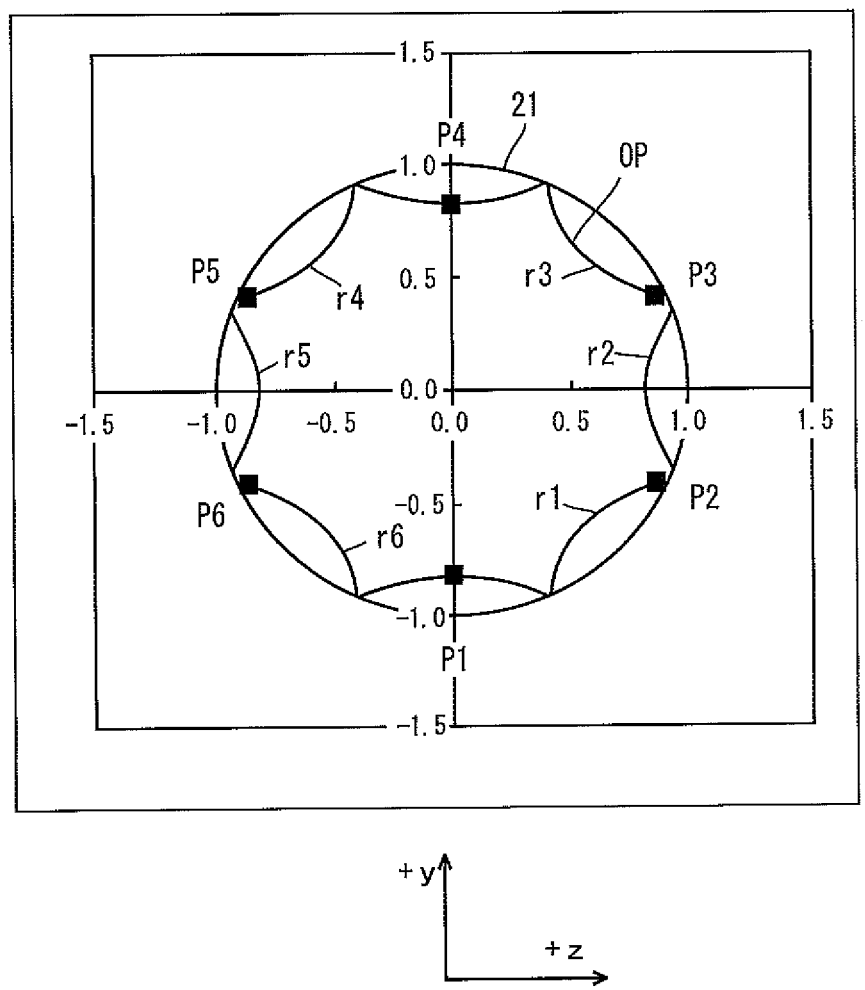
FIG. 20 is a schematic view showing the position of an orbit portion and the positions of crossing points P1 to P6 on a zy plane in an xyz coordinate system of the rotation member.
Figure 21:
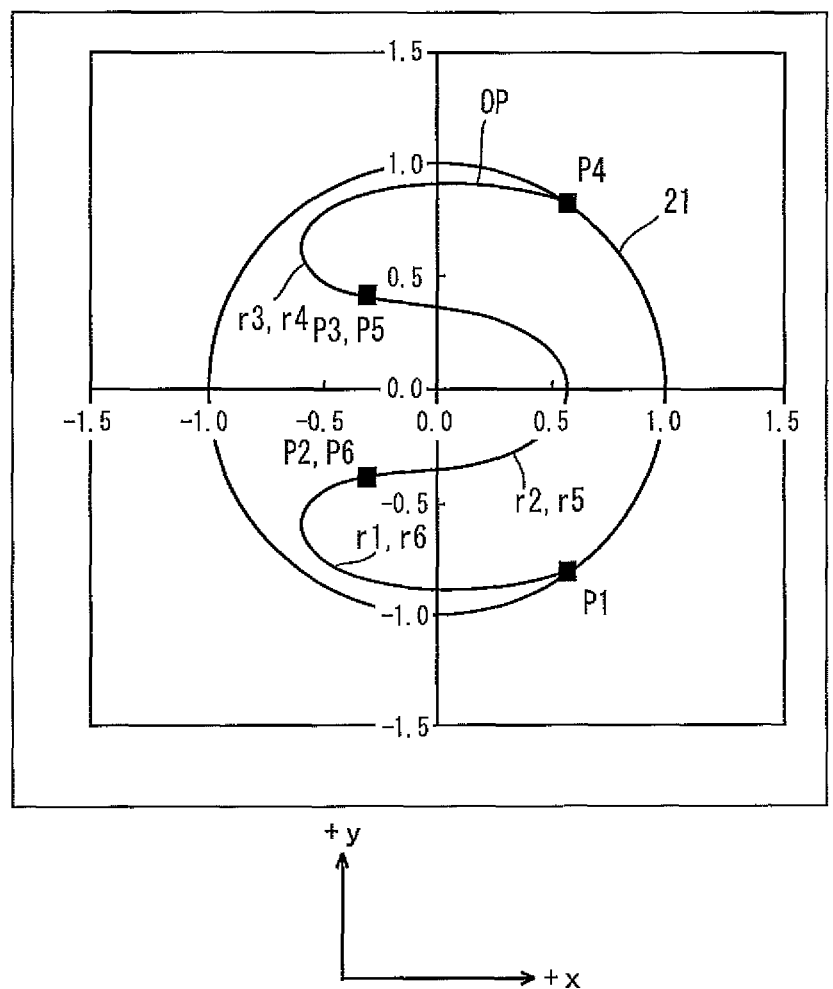
FIG. 21 is a schematic view showing the position of the orbit portion and the positions of the crossing points P1 to P6 on an xy plane.

FIG. 20 is a schematic view showing the position of the orbit portion OP (the loci r1 to r6 of the pen P) and the position of the crossing points P1 to P6 given by the above-described Expressions (30) to (35) on a zy plane in the xyz coordinate system for the rotation member 21. FIG. 21 is a schematic view showing the position of the orbit portion OP and the positions of the crossing points P1 to P6 on an xy plane.

As in the foregoing, the orbit portion OP has a shape that crosses the unit vectors of the crossing points P1 to P6, so that the +y axis of the rotation member 21 is sequentially directed in the +U, −W, +V, −U, +W, and −V directions by the rotation of the shaft 20. Therefore, the six-direction directing device 1 can measure rotational angular velocities $\omega_U$, $\omega_V$, and $\omega_W$ and gravitational accelerations $g_U$, $g_V$, and $g_W$ and can coordinate-transform them into rotational angular velocities $\omega_X$, $\omega_Y$, and $\omega_Z$ and gravitational accelerations $g_X$, $g_Y$, and $g_Z$ in the XYZ rectangular coordinate system to produce an azimuth angle ψ.

The above-described Expressions (30) to (35) represent the crossing points P1 to P6 when the inclination angle α is 35.26 deg. However, the six-direction directing device 1 according to the embodiment can produce an azimuth angle ψ with a certain degree of accuracy if the inclination angle α is not 35.26 deg. Unit vectors of the crossing points P1 to P6 included in the inclination angle α deg are represented by the following Expressions (36) to (41).

$$P1 = \begin{bmatrix} x \\ y \\ z \end{bmatrix} = \begin{bmatrix} \sin\alpha \\ -\cos\alpha \\ 0 \end{bmatrix} \quad (36)$$

$$P2 = \begin{bmatrix} x \\ y \\ z \end{bmatrix} = \begin{bmatrix} -\frac{1}{2}\sin\alpha \\ -\frac{1}{2}\cos\alpha \\ \frac{\sqrt{3}}{2} \end{bmatrix} \quad (37)$$

$$P3 = \begin{bmatrix} x \\ y \\ z \end{bmatrix} = \begin{bmatrix} -\frac{1}{2}\sin\alpha \\ \frac{1}{2}\cos\alpha \\ \frac{\sqrt{3}}{2} \end{bmatrix} \quad (38)$$

$$P4 = \begin{bmatrix} x \\ y \\ z \end{bmatrix} = \begin{bmatrix} \sin\alpha \\ \cos\alpha \\ 0 \end{bmatrix} \quad (39)$$

$$P5 = \begin{bmatrix} x \\ y \\ z \end{bmatrix} = \begin{bmatrix} -\frac{1}{2}\sin\alpha \\ \frac{1}{2}\cos\alpha \\ -\frac{\sqrt{3}}{2} \end{bmatrix} \quad (40)$$

$$P6 = \begin{bmatrix} x \\ y \\ z \end{bmatrix} = \begin{bmatrix} -\frac{1}{2}\sin\alpha \\ -\frac{1}{2}\cos\alpha \\ -\frac{\sqrt{3}}{2} \end{bmatrix} \quad (41)$$

Therefore, the orbit portion OP needs only have a shape that crosses an axis including the crossing points P1 to P6 represented by Expressions (36) to (41). In this way, the shape of the orbit portion OP does not have to satisfy Expressions (24) to (29). When the orbit portion OP extends in a zigzag manner around the x axis to cross the crossing points P1 to P6 represented by Expressions (36) to (41), the y axis of the rotation member 21 is sequentially directed in the +U, −W, +V, −U, +W, and −V directions as the shaft 20 rotates.

Structure of Information Processor

Figure 22:
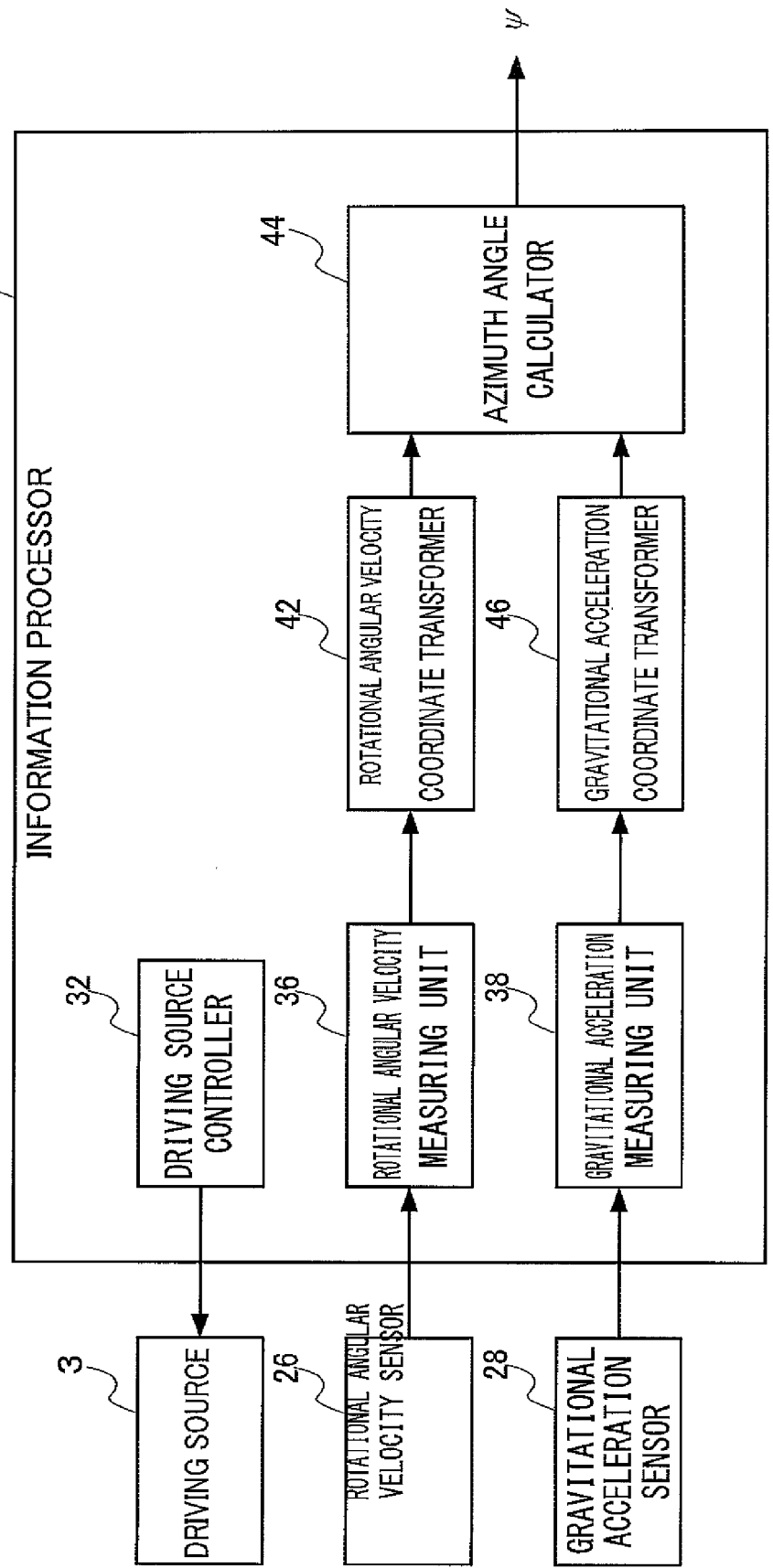
FIG. 22 is a functional block diagram showing a structure of an information processor.

Referring to FIG. 22, the six-direction directing device 1 further includes the information processor 30 such as a computer. The information processor 30 and the rotational angular velocity sensor 26, the gravitational acceleration sensor 28 and the position sensor 25 in the rotation member 21 are connected by wire or wirelessly.

The information processor 30 includes a driving source controller 32, a rotational angular velocity measuring unit 36, a gravitational acceleration measuring unit 38, a rotational angular velocity coordinate transformer 42, a gravitational acceleration coordinate transformer 46, and an azimuth angle calculator 44.

The driving source controller 32 controls the driving source 3. The rotational angular velocity measuring unit 36 measures rotational angular velocity components $\omega_X$, $\omega_Y$, and $\omega_Z$ detected by the rotational angular velocity sensor 26. The gravitational acceleration measuring unit 38 measures gravitational acceleration components $g_U$, $g_V$, and $g_W$ detected by the gravitational acceleration sensor 28.

The rotational angular velocity coordinate transformer 42 coordinate-transforms the rotational angular velocity components $\omega_U$, $\omega_V$, and and $\omega_W$ measured by the rotational angular velocity measuring unit 36 into rotational angular velocity components $\omega_X$, $\omega_Y$, and $\omega_z$ according to the following Expression (42):

$$\begin{bmatrix} \omega_X \\ \omega_Y \\ \omega_Z \end{bmatrix} = \begin{bmatrix} \frac{1}{3\sin\alpha} & \frac{1}{3\sin\alpha} & \frac{1}{3\sin\alpha} \\ 0 & \frac{1}{\sqrt{3}\cos\alpha} & -\frac{1}{\sqrt{3}\cos\alpha} \\ -\frac{2}{3\cos\alpha} & \frac{1}{3\cos\alpha} & \frac{1}{3\cos\alpha} \end{bmatrix} \begin{bmatrix} \omega_U \\ \omega_V \\ \omega_W \end{bmatrix} \quad (42)$$

The gravitational acceleration coordinate transformer 46 coordinate-transforms the gravitational acceleration components $g_U$, $g_V$, and $g_W$ measured by the gravitational acceleration measuring unit 38 into gravitational acceleration components $g_X$, $g_Y$, and $g_Z$ according to the following Expression (43):

$$\begin{bmatrix} g_X \\ g_Y \\ g_Z \end{bmatrix} = \begin{bmatrix} \frac{1}{3\sin\alpha} & \frac{1}{3\sin\alpha} & \frac{1}{3\sin\alpha} \\ 0 & \frac{1}{\sqrt{3}\cos\alpha} & -\frac{1}{\sqrt{3}\cos\alpha} \\ -\frac{2}{3\cos\alpha} & \frac{1}{3\cos\alpha} & \frac{1}{3\cos\alpha} \end{bmatrix} \begin{bmatrix} g_U \\ g_V \\ g_W \end{bmatrix} \quad (43)$$

The azimuth angle calculator 44 produces an azimuth angle $\psi$ based on the rotational angular velocity components $\omega_X$, $\omega_Y$, and $\omega_Z$ obtained by the rotational angular velocity coordinate transformer 42 and the gravitational acceleration components $g_X$, $g_Y$, and $g_Z$ obtained by the gravitational acceleration coordinate transformer 46 according to the following Expression (44).

$$\psi = \tan^{-1}\left(\frac{-\omega_Y\cos\varphi + \omega_Z\sin\varphi}{\omega_X\cos\theta - \omega_Y\sin\varphi\sin\theta + \omega_Z\cos\varphi\sin\theta}\right) \quad (44)$$

$$\phi = \tan^{-1}\left(\frac{g_Y}{g_Z}\right)$$

$$\theta = -\sin^{-1}\left(\frac{g_X}{G}\right)$$

$$G = \sqrt{g_X^2 + g_Y^2 + g_Z^2}$$

Operation of Six-Direction Directing Device 1

The operation of the six-direction directing device 1 having the structure as described above will be described.

Figure 23:
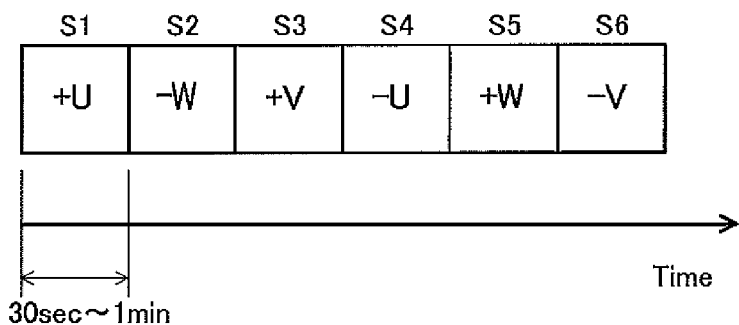
FIG. 23 shows a sequence of an example of the operation of the six-direction directing device 1.

FIG. 23 is a sequence diagram showing an example of the operation of the six-direction directing device 1. Referring to FIG. 23, the driving source controller 32 controls the driving source 3, so that the rotational angular velocity sensor 26 and the gravitational acceleration sensor 28 are sequentially directed in the +U, −W, +V, −U, +W, and −V directions (S1 to S6). The driving source controller 32 rotates the shaft 20 by 240 deg anticlockwise as viewed from the front of the device (i.e., in the −X direction) in steps S1 to S6, the shaft 20, the rotation member 21 having the orbit portion OP, and the guide member 4 interact with one another, so that the sensors 26 and 28 can each be directed to a corresponding direction in each of the steps. More specifically, the sensors 26 and 28 can be directed in the six directions (±U, ±V, and ±W directions) simply by rotating one axis with the one driving source 3.

The six-direction directing device 1 moves the rotation member 21 to a rotation start position first. More specifically, the information processor 30 drives the driving source 3 to rotate the rotation member 21. When the rotation member 21 moves to the rotation start position, the position sensor 25 outputs a detection signal. The information processor 30 determines that the rotation member 21 has moved to the rotation start position upon receiving the detection signal. The six-direction directing device 1 then carries out the operation in step S1.

Referring to FIGS. 20 and 21, in step S1, the rotation member 21 is in the rotation start position. Therefore, the crossing point P1 is on the +Z axis in the XYZ rectangular coordinate system. Therefore, the +y axis of the rotation member 21 matches the +U axis. In this state, during a prescribed measuring period for example from 30 seconds to 1 minute), the rotational angular velocity measuring unit 36 samples a rotational angular velocity component $\omega_U$ detected by the rotational angular velocity sensor 26 every prescribed sampling period (for example from 1 to 10 milliseconds) and stores the sampled values sequentially in a memory that is not shown. Similarly, the gravitational acceleration measuring unit 38 samples a gravitational acceleration component $g_W$ detected by the gravitational acceleration sensor 28 every sampling period (for example 1 to 10 milliseconds) and stores the values sequentially in the memory.

Then, in step S2, in order to sample a rotational angular velocity component caw and a gravitational acceleration component $g_W$ in the −W direction, the shaft 20 is rotated by a rotation angle θ of 240 deg. At the time, the rotation angle 21 rotates. At the time, the guide member 4A provided on the +Z axis passes the locus r1 of the orbit portion OP in FIGS. 20 and 21 and moves to the crossing point P2 as viewed from the rotation member 21. Referring to FIG. 14, the +y axis passes the locus R1 to reach the −W axis. The rotation member 21 rotates around the X axis freely because of the rotation of the shaft 20 and thus rotates around the inclined axis 220 to swing within the range of ±α deg with respect to the X axis and cause the +y axis to be directed to the −W axis. When +y axis reaches the −W axis, the rotational angular velocity measuring unit 36 samples a rotational angular velocity component $\omega_V$ and stores the result in the memory similarly to step S1. The gravitational acceleration measuring unit 38 also samples a gravitational acceleration component $g_V$ and stores the result in the memory.

Similarly to the above step S2, in steps S3 to S6, the shaft 20 is rotated by 240 deg and the y axis of the rotation member 21 is directed in each of the directions (±U, ±V, and ±W directions) on the UVW coordinates. In step S3, the shaft 20 is rotated by θ (240 deg) anticlockwise as viewed from the front of the device from the state in step S2. Then, as viewed from the rotation member 21, the guide member 4A passes the locus r2 of the orbit portion OP in FIGS. 20 and 21 and moves to the crossing point P3. At the time, referring to FIG. 14, the +y axis passes the locus R2 to reach the +V axis and is directed to the +V axis. In this state, the rotational angular velocity measuring unit 36 samples a rotational angular velocity component $\omega_U$ and the gravitational acceleration measuring unit 38 also samples a gravitational acceleration component $g_U$.

In step S4, the shaft 20 is further rotated by 240 deg anti-clockwise. Then, as viewed from the rotational member 21, the guide member 4A passes the locus r3 of the orbit portion OP in FIGS. 20 and 21 and moves to the crossing point P4. At the time, referring to FIG. 14, the +y axis passes the locus R3 to reach the −U axis and is directed to the −U axis. In this state, the rotational velocity measuring unit 36 again samples a rotational angular velocity component $\omega_U$ and the gravitational acceleration measuring unit 38 also samples a gravitational acceleration component $g_U$. More specifically, the six-direction directing device 1 measures the rotational angular velocity $\omega_U$ and the gravitational acceleration component $g_U$ both in the +U and −U directions on the U axis.

Similarly, in step S5, the shaft 20 is further rotated by 240 deg anticlockwise. At the time, as viewed from the rotation member 21, the guide member 4A passes the locus r4 of the orbit portion OP in FIGS. 20 and 21 and moves to the crossing point P5. As a result, referring to FIG. 14, the +y axis passes the locus R4 to reach the +W axis and is directed to the +W axis. In this state, the rotational angular measuring unit 36 again samples a rotational angular velocity component caw and the gravitational acceleration measuring unit 38 also samples a gravitational acceleration component $g_W$.

In step S6, the shaft 20 is further rotated anticlockwise by 240 deg. At the time, as viewed from the rotation member 21, the guide member 4A passes the locus r5 of the orbit portion OP in FIGS. 20 and 21 and moves to the crossing point P6. As a result, referring to FIG. 14, the +y axis passes the locus R5 to reach the −V axis and is directed to the −V axis. In this state, the rotational angular velocity measuring unit 36 again samples a rotational angular velocity component $\omega_V$ and the gravitational acceleration measuring unit 38 also samples a gravitational acceleration component $g_V$.

The rotational angular velocity measuring unit 36 produces $\omega_X$, $\omega_Y$, and $\omega_Z$ in the UVW rectangular coordinate system by a least square or arithmetic mean method using the data sampled in steps S1 to S6. On the other hand, the gravitational acceleration measuring unit 38 produces gravitational accelerations $g_X$, $g_Y$, and $g_Z$ in the UVW rectangular coordinate system by a least square or arithmetic mean method. Here, for any of the U, V, and W axes, the rotational angular velocities ($\omega_U$, $\omega_V$, and $\omega_W$) and the gravitational accelerations ($g_U$, $g_V$, and $g_W$) measured both in the + and − directions are averaged. Therefore, biases unique to the rotational angular velocity measuring unit 36 and the gravitational acceleration measuring unit 38 in the six-direction directing device 1 are cancelled, so that measuring errors can be reduced.

Then, the rotational angular velocity coordinate transformer 42 coordinate-transforms the rotational angular velocities ($\omega_X$, $\omega_Y$, and $\omega_Z$) calculated by the rotational angular velocity measuring unit 36 into rotational angular velocities ($g_X$, $g_Y$, and $g_Z$) in the XYZ rectangular coordinate system. The gravitational acceleration coordinate transformer 46 coordinate-transforms the gravitational accelerations ($g_U$, $g_V$, and $g_W$) produced by the gravitational acceleration measuring unit 38 into gravitational accelerations ($g_X$, $g_Y$, and $g_Z$) in the XYZ rectangular coordinate system.

Finally, the azimuth angle calculator 44 calculates an azimuth angle ψ based on the rotational angular velocities ($\omega_X$, $\omega_Y$, and $\omega_Z$) and the gravitational accelerations ($g_X$, $g_Y$, and $g_Z$) obtained by the rotational angular velocity coordinate transformer 42 and the gravitational acceleration coordinate transformer 46.

As in the foregoing, the six-direction directing device 1 allows the +y axis of the rotation member 21 to be directed in the six directions (±U, ±V, and ±W directions) by the shaft 20, the rotation member 21 having the zigzag orbit portion OP and the guide member 4 only using the one driving source 3 and allows the sensors 26 and 28 to be directed in the six directions.

The six-direction directing device 1 uses the U, V, and W axes, so that the rotational angular velocity sensor 26 and the gravitational acceleration sensor 28 need only swing by ±α (70.52) deg to be directed in the six directions, the rotation angle is small and a large space for rotation is not necessary. In addition, the operation can be carried out only with the single rotational driving source, so that the device can be even more compact.

Furthermore, the six-direction directing device 1 forms the orbit portion OP on the spherical surface SS of the rotation member 21. Therefore, the orbit portion OP can be formed relatively easily. Unlike the six-direction directing device disclosed by WO2010/047078, it is not necessary to surround the outer part of the rotation member with a guide and to form an orbit slit at the guide.

In the above-described embodiment, the elevation angle α is 35.26 deg but the elevation angle is not limited to the angle and may be any angle from 30 to 40 deg.

In the six-direction directing device 1 according to the embodiment, the three guide members 4A to 4C are provided at intervals of 120 deg around the X axis on the same YZ plane, and one of the guide members (guide member 4A) is provided on the +Z axis. In this way, the rotation member 21 can be supported rotatably in a more stable manner at the case 10. In this case, the three guide members 4A to 4C move on the same orbit portion OP as viewed from the rotation member 21 as the rotation member 21 rotates for the following reason.

Figure 24:
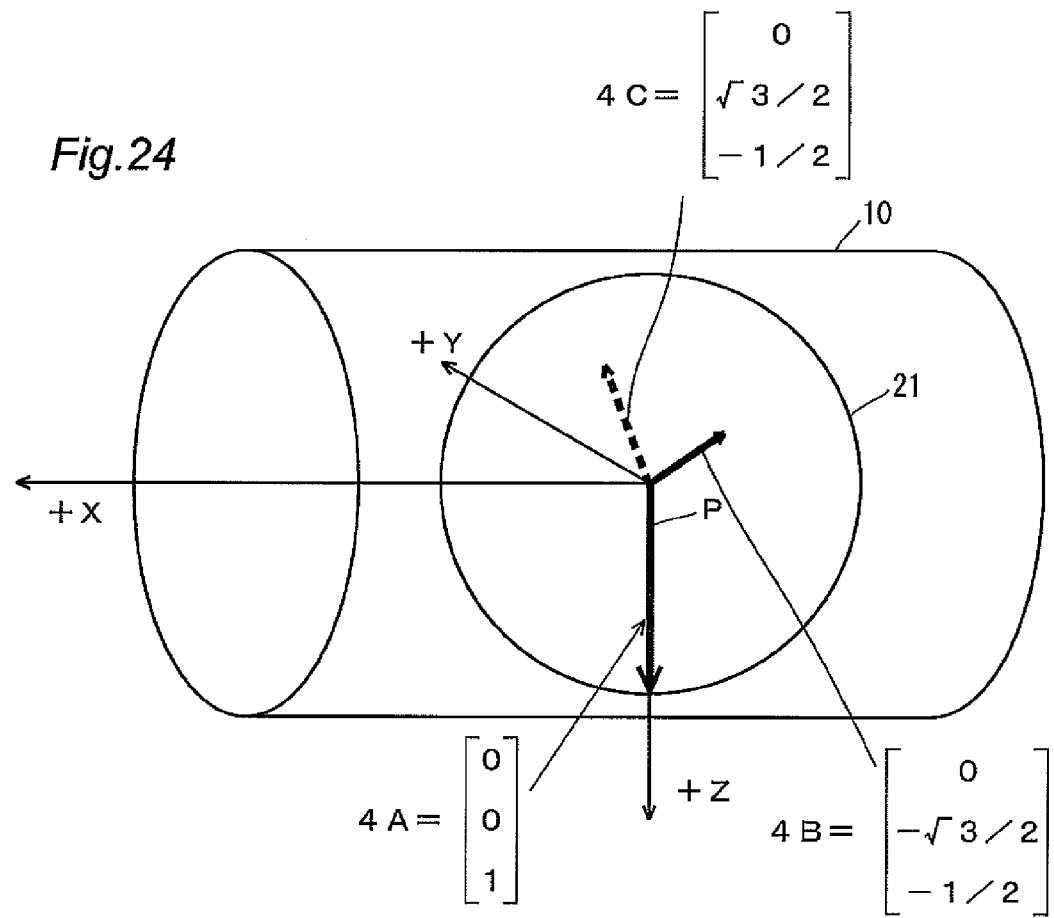
FIG. 24 is a schematic view showing a positional relation among the guide members in the XYZ rectangular coordinate system.

FIG. 24 is a schematic view showing a positional relation among the guide members 4A to 40 in the XYZ rectangular coordinate system. Referring to FIG. 24, in a reference position, a position vector of a point 4A on the orbit portion OP where the guide member 4A is provided, a position vector of a point 4B where the guide member 4B is provided, and a position vector of a point 4C where the guide member 4C is provided are represented by Expression (45).

$$4A = \begin{bmatrix} x \\ y \\ z \end{bmatrix} = \begin{bmatrix} i_X & i_Y & i_Z \\ j_X & j_Y & j_Z \\ k_X & k_Y & k_Z \end{bmatrix} \begin{bmatrix} 0 \\ 0 \\ 1 \end{bmatrix} = \begin{bmatrix} i_Z \\ j_Z \\ k_Z \end{bmatrix} \quad (45)$$

$$4B = \begin{bmatrix} x \\ y \\ z \end{bmatrix} = \begin{bmatrix} i_X & i_Y & i_Z \\ j_X & j_Y & j_Z \\ k_X & k_Y & k_Z \end{bmatrix} \begin{bmatrix} 0 \\ -\sqrt{3}/2 \\ -1/2 \end{bmatrix} = \begin{bmatrix} \frac{-\sqrt{3}\,i_Y - i_Z}{2} \\ \frac{-\sqrt{3}\,j_Y - j_Z}{2} \\ \frac{-\sqrt{3}\,k_Y - k_Z}{2} \end{bmatrix}$$

$$4C = \begin{bmatrix} x \\ y \\ z \end{bmatrix} = \begin{bmatrix} i_X & i_Y & i_Z \\ j_X & j_Y & j_Z \\ k_X & k_Y & k_Z \end{bmatrix} \begin{bmatrix} 0 \\ \sqrt{3}/2 \\ -1/2 \end{bmatrix} = \begin{bmatrix} \frac{\sqrt{3}\,i_Y - i_Z}{2} \\ \frac{\sqrt{3}\,j_Y - j_Z}{2} \\ \frac{\sqrt{3}\,k_Y - k_Z}{2} \end{bmatrix}$$

The guide members 4A to 4C are fixed to the XYZ rectangular coordinate system. Therefore, the rotation member 21 rotates by 480 deg, so that the point 4A reaches the guide member 4B. Then, the rotation member 21 rotates by 960 deg, so that the point 4A reaches the guide member 4C. More specifically, the rotation angle θ between the points 4A and 4B is 480 deg, and the rotation angle θ between the points 4A and 4C is 960 deg.

Use of Expression (45) leads to Expression (46).

$$\begin{bmatrix} i_Z \\ j_Z \\ k_Z \end{bmatrix}_{\theta=\theta_0} = \begin{bmatrix} \frac{-\sqrt{3}\,i_Y - i_Z}{2} \\ \frac{-\sqrt{3}\,j_Y - j_Z}{2} \\ \frac{-\sqrt{3}\,k_Y - k_Z}{2} \end{bmatrix}_{\theta=\theta_0+480\,deg} = \begin{bmatrix} \frac{\sqrt{3}\,i_Y - i_Z}{2} \\ \frac{\sqrt{3}\,j_Y - j_Z}{2} \\ \frac{\sqrt{3}\,k_Y - k_Z}{2} \end{bmatrix}_{\theta=\theta_0+960\,deg} \quad (46)$$

Here, $\theta_0$ is an arbitrary rotation angle (from 0 to 1440 deg). From Expression (40), a position vector of the point 4A at the rotation angle $\theta_0$ is equal to a position vector of the point 4B at the rotation angle $\theta_0$+480 deg and to a position vector of the point 4C at the rotation angle $\theta_0$+960 deg. Therefore, the three guide members 4A to 4C can move on the same orbit portion OP.

As in the foregoing, the overview structure and operation of the six-direction directing device 1 has been described. According to the above-described embodiment, the orbit portion OP is a groove, while the orbit portion OP may be any other structure than the groove. For example, the orbit portion OP may be a rail having a cross section in a raised form. In this example, the guide members 4A to 4C may be wheels in contact with the rail.

In the above-described embodiment, the plurality of guide members 4A to 4C are provided but one or two guide members may be provided. The rotation member 21 can rotate even with one or two guide members. In short, the number of the guide members 4 to provide does not have to be three. However, if the guide members 4A to 4C are provided as described above, the rotation member 21 can rotate in a significantly stable manner.

As described above, the elevation angle $\alpha$ is preferably from 30 to 40 deg, most preferably 35.26 deg. This is substantially for the same reason as the reason disclosed by JP-A 2008-215956 and International Publication WO2010/047078.

As described above, according to the embodiment, the shaft 20, the rotation member 21, and the guide member 4 interact with one another, so that the rotation of the shaft 20 using the one driving source 3 allows the rotational angular velocity sensor 26 and the gravitational acceleration sensor 28 to be directed in all the directions in the UVW coordinate system (±U, ±V, and ±W directions, i.e., six directions in total). In addition, since the rotational angular velocity sensor 26 and the gravitational acceleration sensor 28 swing only by ±$\alpha$ deg, the rotation angle is small and a large space for rotation is not necessary. As a result, the device can be more compact.

If the UVW coordinate system is a rectangular coordinate system and the elevation angle $\alpha$ is 35.26 deg, rotational angular velocity components $\omega_X$, $\omega_Y$, and $\omega_Z$ have the same measurement error among them in the XYZ rectangular coordinate system and the gravitational acceleration components $g_X$, $g_Y$, and $g_Z$ have the same measurement error in the XYZ rectangular coordinate system. Measurement errors for the azimuth angle $\psi$ are reduced without depending on the position of the six-direction directing device 1. The six-direction directing device 1 needs only be provided in an arbitrary position, so that a standard requirement such as a horizontal plane is not necessary and a direction can be measured easily.

Not only the azimuth angle $\psi$ but also the latitude of the location where the six-direction directing device 1 is provided can be measured correctly. In addition, if a roll angle $\Phi$ and a pitch angle $\theta$ are calculated as well as the azimuth angle, the attitude and heading of the provided six-direction directing device 1 can be measured.

Rotational angular velocities ($\omega_U$, $\omega_V$, and $\omega_W$) and gravitational accelerations ($g_U$, $g_V$, and $g_W$) measured both in the + and − directions on any of the U, V, and W axes are averaged, so that biases unique to the six-direction directing device 1 can be cancelled and measurement errors can be reduced.

Furthermore, the orbit portion OP is formed at the rotation member 21, which allows the structure to be simpler, so that the orbit portion OP can be processed or produced more easily.

In the above-described embodiment, the six-direction directing device 1 samples rotational angular velocity components and gravitational acceleration components on the U, V, and W axes. However, the six-direction directing device 1 may sample such components only on one or two of the U, V, and W axes.

In steps S1 to S6, the six-direction directing device 1 rotates the shaft 20 anticlockwise as viewed from the front of the device (or in the −X direction). However, the device may rotate the shaft clockwise.

In the above-described embodiment, the six-direction directing device includes the rotational angular velocity sensor 26 and the gravitational acceleration sensor 28 and serves as a direction measuring device. However, the six-direction directing device may be applied for other uses than the direction measuring device.

For example, if a CCD camera that photographs in the +y direction is provided on the rotation member 21 instead of the rotational angular velocity sensor 26 and the gravitational acceleration sensor 28, the six-direction directing device may be used as a monitoring camera capable of photographing in the six directions. The six-direction directing device may be used as a receiving antenna. In short, the six-direction directing device according to the present invention can be applied in all uses in which a device provided on a rotation member such as a sensor, a camera, and an antenna must be directed in the six directions.

A known biaxial gimbal mechanism has been used as a device that creates a pseudo gravity-free state on the earth. The mechanism constantly changes the gravity direction by rotation around the two axes to achieve a state close to a free-gravity state. The six-direction directing device according to the present invention may be used as a pseudo free-gravity state producing device instead of the biaxial gimbal mechanism.

Although the present invention has been described and illustrated, it is clearly understood that the same is by way of illustration and example only. The invention is not limited to the above-described embodiments and can be subject to variations and modifications without departing the scope and spirit of the present invention.

What is claimed is:

1. A six-direction directing device provided in an XYZ rectangular coordinate system, comprising:
    a shaft extending in an X axis direction,
    a rotation member rotatable around an axis inclined at $\alpha$ deg with respect to the shaft and coupled to the shaft, said rotation member having an xyz rectangular coordinate system and including a spherical surface and an orbit portion formed around an x axis of said spherical surface;
    a driving source that rotates said shaft around the X axis; and
    a guide member fixed to said XYZ rectangular coordinate system and in contact with said orbit portion,
    said orbit portion having such a shape that a y axis of said rotation member is directed sequentially in + and − directions on U, V, and W axes that cross one another at intervals of 60 deg around the X axis when said rotation member rotates in contact with said guide member by rotation of said shaft.

2. The six-direction directing device according to claim 1, wherein said orbit portion has a zigzag shape that has four mountain-like portions raised in a + direction on the x axis and four valley-like portions raised in a − direction on the x axis.

3. The six-direction directing device according to claim 1, wherein said orbit portion crosses unit vectors P1 to P6 of xyz rectangular coordinate components represented by Expressions (1) to (6):

$$P1 = \begin{bmatrix} x \\ y \\ z \end{bmatrix} = \begin{bmatrix} \sin\alpha \\ -\cos\alpha \\ 0 \end{bmatrix} \quad (1)$$

$$P2 = \begin{bmatrix} x \\ y \\ z \end{bmatrix} = \begin{bmatrix} -\frac{1}{2}\sin\alpha \\ -\frac{1}{2}\cos\alpha \\ \frac{\sqrt{3}}{2} \end{bmatrix} \quad (2)$$

$$P3 = \begin{bmatrix} x \\ y \\ z \end{bmatrix} = \begin{bmatrix} -\frac{1}{2}\sin\alpha \\ \frac{1}{2}\cos\alpha \\ \frac{\sqrt{3}}{2} \end{bmatrix} \quad (3)$$

$$P4 = \begin{bmatrix} x \\ y \\ z \end{bmatrix} = \begin{bmatrix} \sin\alpha \\ \cos\alpha \\ 0 \end{bmatrix} \quad (4)$$

$$P5 = \begin{bmatrix} x \\ y \\ z \end{bmatrix} = \begin{bmatrix} -\frac{1}{2}\sin\alpha \\ \frac{1}{2}\cos\alpha \\ -\frac{\sqrt{3}}{2} \end{bmatrix} \quad (5)$$

$$P6 = \begin{bmatrix} x \\ y \\ z \end{bmatrix} = \begin{bmatrix} -\frac{1}{2}\sin\alpha \\ -\frac{1}{2}\cos\alpha \\ -\frac{\sqrt{3}}{2} \end{bmatrix}. \quad (6)$$

4. The six-direction directing device according to claim 3, wherein when a rotation angle of said shaft around said X axis is $\theta$ deg, a Z axis component of a unit vector of the x axis is $i_Z$, and a Z axis component of a unit vector of a y axis is $j_Z$, and a Z axis component of a unit vector of a z axis is $k_Z$, said orbit portion has a shape similar to a locus represented by Expressions (7) to (12):

if $\theta$ is from 0 to 240 deg, $$\begin{bmatrix} i_Z \\ j_Z \\ k_Z \end{bmatrix} = \begin{bmatrix} \frac{\cos\theta}{\sqrt{3}} \\ \frac{-\sin\theta + \sqrt{3}}{3a_{12}} \\ \frac{-2(\cos\theta - 1) + \sin\theta(\sqrt{3}\cos\theta + \sin\theta)}{3\sqrt{6}\, a_{12}} \end{bmatrix} \quad (7)$$

$$a_{12} = \sqrt{\frac{(\sqrt{3}\cos\theta + \sin\theta)^2}{18} + \frac{(\cos\theta - 1)^2}{9} + \frac{(\sin\theta + \sqrt{3})^2}{9}}$$

if $\theta$ is from 240 to 480 deg, $$\begin{bmatrix} i_Z \\ j_Z \\ k_Z \end{bmatrix} = \begin{bmatrix} \frac{\cos\theta}{\sqrt{3}} \\ \frac{\sin\theta}{3a_{23}} \\ \frac{\sqrt{2}(\cos\theta + 2 + \sin^2\theta)}{3\sqrt{3}\, a_{23}} \end{bmatrix} \quad (8)$$

$$a_{23} = \sqrt{\frac{(\cos\theta + 2)^2}{9} + \frac{\sin^2\theta}{3}}$$

if $\theta$ is from 480 to 720 deg, $$\begin{bmatrix} i_Z \\ j_Z \\ k_Z \end{bmatrix} = \begin{bmatrix} \frac{\cos\theta}{\sqrt{3}} \\ -\frac{\sin\theta - \sqrt{3}}{3a_{34}} \\ -\frac{2(\cos\theta - 1) + \sin\theta(\sqrt{3}\cos\theta - \sin\theta)}{3\sqrt{6}\, a_{34}} \end{bmatrix} \quad (9)$$

$$a_{34} = \sqrt{\frac{(\sqrt{3}\cos\theta - \sin\theta)^2}{18} + \frac{(\cos\theta - 1)^2}{9} + \frac{(\sin\theta - \sqrt{3})^2}{9}}$$

if $\theta$ is 720 to 960 deg, $$\begin{bmatrix} i_Z \\ j_Z \\ k_Z \end{bmatrix} = \begin{bmatrix} \frac{\cos\theta}{\sqrt{3}} \\ \frac{\sin\theta + \sqrt{3}}{3a_{45}} \\ \frac{2(\cos\theta - 1) - \sin\theta(\sqrt{3}\cos\theta + \sin\theta)}{3\sqrt{6}\, a_{45}} \end{bmatrix} \quad (10)$$

$$a_{45} = \sqrt{\frac{(\sqrt{3}\cos\theta + \sin\theta)^2}{18} + \frac{(\cos\theta - 1)^2}{9} + \frac{(\sin\theta + \sqrt{3})^2}{9}}$$

if $\theta$ is from 960 to 1200 deg, $$\begin{bmatrix} i_Z \\ j_Z \\ k_Z \end{bmatrix} = \begin{bmatrix} \frac{\cos\theta}{\sqrt{3}} \\ -\frac{\sin\theta}{3a_{56}} \\ -\frac{\sqrt{2}(\cos\theta + 2 + \sin^2\theta)}{3\sqrt{3}\, a_{56}} \end{bmatrix} \quad (11)$$

$$a_{56} = \sqrt{\frac{(\cos\theta + 2)^2}{9} + \frac{\sin^2\theta}{3}}$$

and if θ is from 1200 to 1440 deg, $$\begin{bmatrix} i_Z \\ j_Z \\ k_Z \end{bmatrix}_{61} = \begin{bmatrix} \dfrac{\cos\theta}{\sqrt{3}} \\ \dfrac{\sin\theta - \sqrt{3}}{3a_{61}} \\ \dfrac{2(\cos\theta - 1) + \sin\theta(\sqrt{3}\cos\theta - \sin\theta)}{3\sqrt{6}\, a_{61}} \end{bmatrix} \quad (12)$$

$$a_{61} = \sqrt{\dfrac{(\sqrt{3}\cos\theta - \sin\theta)^2}{18} + \dfrac{(\cos\theta - 1)^2}{9} + \dfrac{(\sin\theta - \sqrt{3})^2}{9}}\,.$$

5. The six-direction directing device according to claim 1, wherein said orbit portion is a groove formed on said spherical surface.

6. The six-direction directing device according to claim 5, wherein said guide member comprises a rotatable ball, and said ball is in contact with said orbit portion.

7. The six-direction directing device according to claim 1, further comprising three of said guide members provided at equal intervals around the X axis on a YZ plane.

8. The six-direction directing device according to claim 1, further comprising:
a rotational angular velocity sensor provided at said rotation member to be directed in the y axis direction and detect rotational angular velocity components $\omega_U$, $\omega_V$, and $\omega_W$ around the U, V, and W axes;
a gravitational acceleration sensor provided at said rotation member to be directed in the y axis direction and detect gravitational acceleration components $g_U$, $g_V$, and $g_W$ in the U, V, and W axis directions;
measuring means for measuring the rotational angular velocity components $\omega_U$, $\omega_V$, and $\omega_W$ detected by said rotational angular velocity sensor and the gravitational acceleration components $g_U$, $g_V$, and $g_W$ detected by said gravitational acceleration sensor when said y axis is directed in the + and − directions on the U, V, and W axes by rotation of said rotation member;
rotational angular velocity coordinate transforming means for coordinate-transforming said measured rotational angular velocity components $\omega_U$, $\omega_V$, and cow into rotational angular velocity components $\omega_X$, $\omega_Y$, and $\omega_Z$;
gravitational acceleration coordinate transforming means for coordinate-transforming said measured gravitational acceleration components $g_U$, $g_V$, and $g_W$ into gravitational acceleration components $g_X$, $g_Y$, and $g_Z$; and
azimuth angle calculating means for calculating an azimuth angle $\psi$ based on the obtained rotational angular velocity components $\omega_X$, $\omega_Y$, and $\omega_Z$ and gravitational acceleration components $g_X$, $g_Y$, and $g_Z$.

9. The six-direction directing device according to claim 8, wherein said rotational angular velocity coordinate-transforming means coordinate-transforms said rotational angular velocity components $\omega_U$, $\omega_V$, and $\omega_W$ into said rotational angular velocity components $\omega_X$, $\omega_Y$, and $\omega_Z$ by Expression (13):

$$\begin{bmatrix} \omega_X \\ \omega_Y \\ \omega_Z \end{bmatrix} = \begin{bmatrix} \dfrac{1}{3\sin\alpha} & \dfrac{1}{3\sin\alpha} & \dfrac{1}{3\sin\alpha} \\ 0 & \dfrac{1}{\sqrt{3}\cos\alpha} & -\dfrac{1}{\sqrt{3}\cos\alpha} \\ -\dfrac{2}{3\cos\alpha} & \dfrac{1}{3\cos\alpha} & \dfrac{1}{3\cos\alpha} \end{bmatrix} \begin{bmatrix} \omega_U \\ \omega_V \\ \omega_W \end{bmatrix} \quad (13)$$

said gravitational acceleration coordinate transforming means coordinate-transforms said gravitational acceleration components $g_U$, $g_V$, and $g_W$ into gravitational acceleration components $g_X$, $g_Y$, and $g_Z$ by Expression (14):

$$\begin{bmatrix} g_X \\ g_Y \\ g_Z \end{bmatrix} = \begin{bmatrix} \dfrac{1}{3\sin\alpha} & \dfrac{1}{3\sin\alpha} & \dfrac{1}{3\sin\alpha} \\ 0 & \dfrac{1}{\sqrt{3}\cos\alpha} & -\dfrac{1}{\sqrt{3}\cos\alpha} \\ -\dfrac{2}{3\cos\alpha} & \dfrac{1}{3\cos\alpha} & \dfrac{1}{3\cos\alpha} \end{bmatrix} \begin{bmatrix} g_U \\ g_V \\ g_W \end{bmatrix} \quad (14)$$

and
said azimuth angle calculation means calculates an azimuth angle $\psi$ based on said rotational angular velocity components $\omega_X$, $\omega_Y$, and $\omega_Z$ and said gravitational acceleration components $g_X$, $g_Y$, and $g_Z$ by Expression (15):

$$\psi = \tan^{-1}\left(\dfrac{-\omega_Y\cos\varphi + \omega_Z\sin\varphi}{\omega_X\cos\theta - \omega_Y\sin\varphi\sin\theta + \omega_Z\cos\varphi\sin\theta}\right) \quad (15)$$

$$\phi = \tan^{-1}\left(\dfrac{g_Y}{g_Z}\right)$$

$$\theta = -\sin^{-1}\left(\dfrac{g_X}{G}\right)$$

$$G = \sqrt{g_X^2 + g_Y^2 + g_Z^2}\,.$$

10. The six-direction directing device according to claim 9, wherein said α is from 30 to 40 deg.

11. The six-direction directing device according to claim 10, wherein said α is 35.26 deg.

12. The six-direction directing device according to claim 8, wherein said rotation member has a storage chamber having an opening at its front part, and
said rotational angular velocity sensor and said gravitational acceleration sensor are stored in said storage chamber.

13. The six-direction directing device according to claim 12, wherein the opening of said storage chamber has a rectangular shape, and
each corner of said opening is provided corresponding to one of said valley-like portions.

14. The six-direction directing device according to claim 1, further comprising a position sensor that detects a rotation start position for said rotation member.

* * * * *